United States Patent
Chang et al.

(10) Patent No.: US 7,127,498 B2
(45) Date of Patent: Oct. 24, 2006

(54) SOFTWARE APPLICATION DOMAIN AND STORAGE DOMAIN CONSTRAINING PROCESS AND METHOD

(75) Inventors: David Fu-Tien Chang, Sudbury, MA (US); Ashutosh Ashutosh, Weston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 775 days.

(21) Appl. No.: 10/244,825

(22) Filed: Sep. 16, 2002

(65) Prior Publication Data

US 2004/0054758 A1 Mar. 18, 2004

(51) Int. Cl.
*G06F 12/14* (2006.01)
*G06F 13/16* (2006.01)

(52) U.S. Cl. .................. 709/217; 710/9; 710/316; 711/152; 711/163

(58) Field of Classification Search ............. 709/217, 709/218, 219; 710/9, 317
See application file for complete search history.

(56) References Cited

FOREIGN PATENT DOCUMENTS

JP 2001306412 A * 2/2001

* cited by examiner

*Primary Examiner*—Jack A. Lane

(57) ABSTRACT

A method for constraining access to a storage system includes assigning a permanent bus identification to a storage device included in the storage system, creating a zone including a switch and the storage device included in the storage system such that data only passes to the storage device from the switch, and restricting access to the storage device from a server included in the storage system.

24 Claims, 19 Drawing Sheets

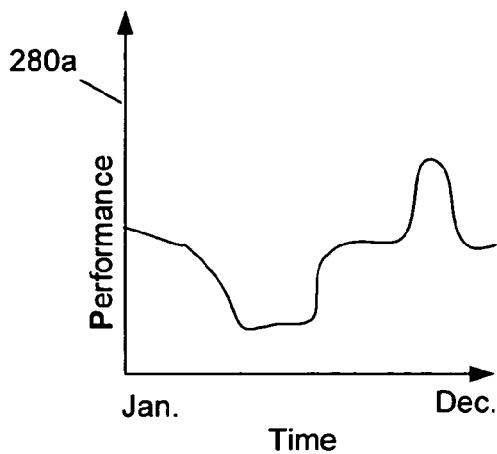
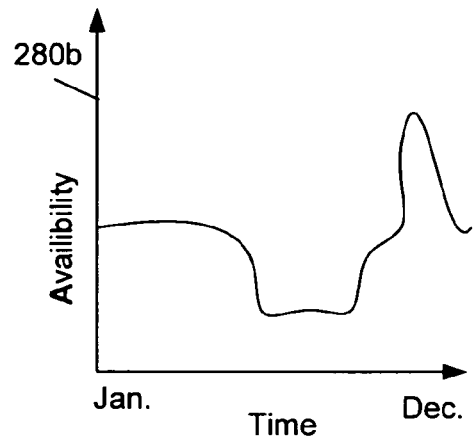
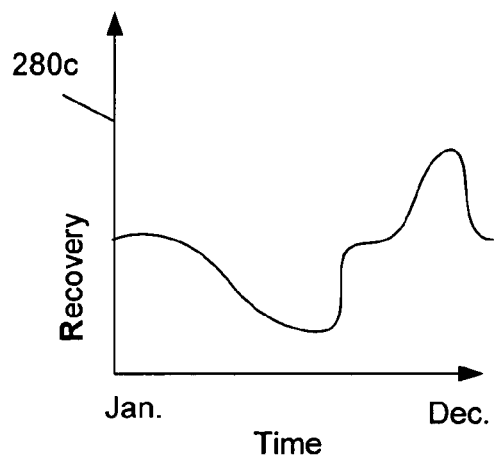
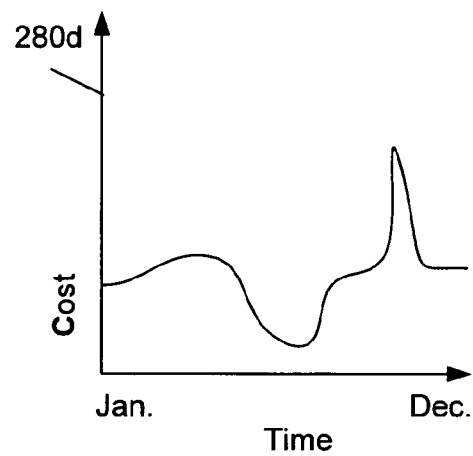
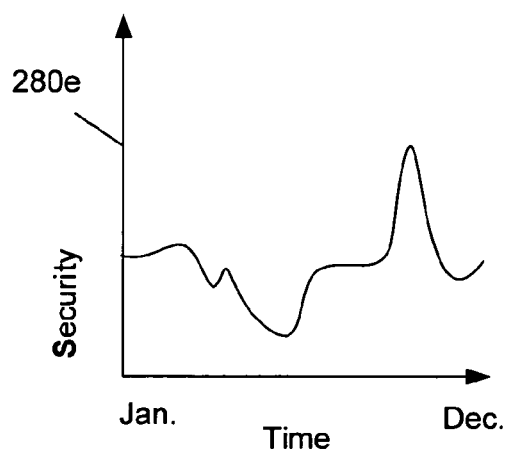
FIG. 9

SOFTWARE APPLICATION DOMAIN AND STORAGE DOMAIN CONSTRAINING PROCESS AND METHOD

BACKGROUND

This invention relates to managing software application domains and storage domains.

Data storage systems receive, store, and provide access for data retrieval by software applications such as database applications or other types of software. For determining internal layouts of the storage systems, representative maps can be displayed to provide insight of the hardwire interconnections within the storage system. The representative maps may be shown as a graphical tree structure where tree branches represent the interconnections of the storage system.

SUMMARY

According to an aspect of this invention, a method for constraining access to a storage system includes assigning a permanent bus identification to a storage device included in the storage system, creating a zone including a switch and the storage device included in the storage system such that data only passes to the storage device from the switch, and restricting access to the storage device from a server included in the storage system.

One or more of the following features may also be included.

A storage device may be included in a storage area network. The bus identification may be a SCSI identification number.

One or more advantages can be provided from the above. By monitoring data paths of software applications and storage systems respectively included in a software application domain and storage domain, complete maps of the data paths may be created that include both the software application domain and the storage domain along with the components that reside in both domains. Further, by stitching and mapping the components of both the application and storage domain, the components may be included in a comprehensive risk analysis, performance evaluation, and modeling and simulation for system upgrading. Thus by monitoring the components included in the application and storage domain, characterization measures that include system performance, availability, recoverability, cost and security may be computed for the complete combination of the two domains or a portion of the two domains. Additionally, by constraining access to particular components and data paths in the storage domain, data storage efficiency may be increased while still providing the appropriate storage capacity.

DESCRIPTION OF DRAWINGS

FIG. 9 represents five characterization measures as a function of time.

DETAILED DESCRIPTION

Figure 1:
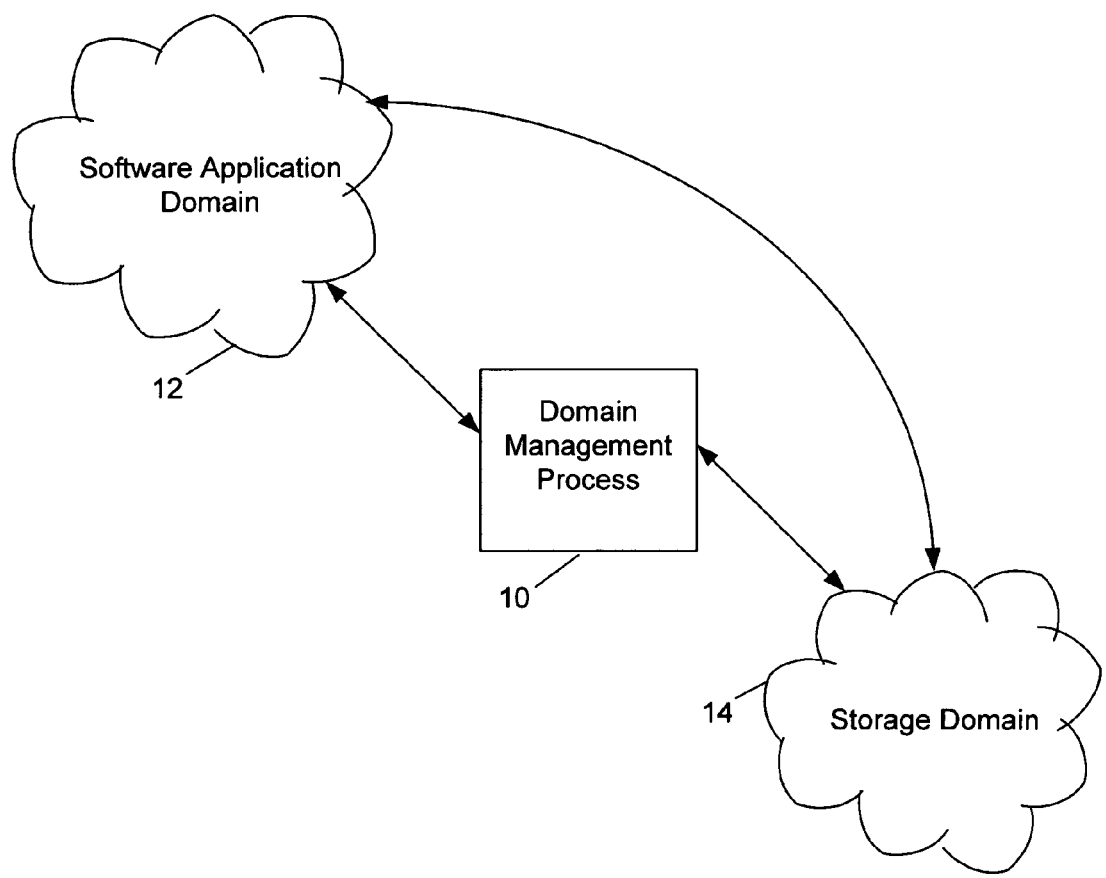
FIG. 1 is a block diagram depicting an arrangement between software application and storage domains, and a domain management process.

Referring to FIG. 1, a domain management process 10 provides end-to-end enterprise-wide data management between a software application domain 12 and a storage domain 14. The software application domain 12 includes one or more software applications and an operating system, which are individually in communication with the domain management process 10 and are stored and executed on components included in the storage domain 14. The domain management process 10 is a dedicated management station and serves multiple purposes and can be clustered for added redundancy and load balancing as well as for higher availability of the storage domain 14. Since the domain management process 10 is in communication with both domains, the management process collects configuration data from both domains 12, 14 to provide a complete representation of software data paths between the software application domain 12 and the storage domain 14 along with physical and logical data paths between the components of the storage domain. Physical data paths represent the physical connections between two components in the storage domain 14. For example a server, located in the storage domain 14, can be connected to a storage device, also located in the storage domain, by a network connection that provides ten potential physical data paths between the devices. However, only one or two of the ten paths may be software configured to actively pass data between the server and the storage device. These one or two software configured paths are logical data paths and are typically a subset of the physical data paths. By collecting the configuration data from both domains, the domain management process 10 examines global and local configuration dependencies across the software application domain 12 and the storage domain 14. In some arrangements, an operating system is included in the software application domain 12 and the domain management process 10 collects configuration information from the operating system to examine such dependencies among the software application domain 12, the storage domain 14, and the operating system. Also in some arrangements, switches and their associated switch ports that can be included in the storage domain 14 are not included in a logical data path.

The domain management process 10 provides a variety of functions and capabilities, such as proactively configuring and monitoring the software application and storage domains 12, 14. The domain management process 10 provides a unified virtualization configuration while monitoring interfaces of components of the storage domain 14 and their interactions with the software application domain 12. The domain management process 10 also provides functionality for actively isolating and avoiding faults within the application and storage domains 12, 14. The process 10 also provides a common interface to each application included in the software application domain 12 and the components of the storage domain 14. In addition, the domain management process 10 generates and provides a user with various activity and performance reports of the two domains interacting along with reports of the individual performance of the domains and the included components.

Application domain 12 includes one or more software applications e.g., mail servers and information management software such as relational database products. The storage domain 14 includes components such as host servers and switches along with one or more storage subsystems that include network-attached storage (NAS) devices (e.g., a hard drives), which are typically assigned a permanent network address, and storage area network (SAN) subsystems that interconnect data storage devices and are typically part of an overall network of computing resources for an enterprise. The storage domain may also include the NAS subsystems, SAN subsystems, and other storage devices individually or in combination.

In some arrangements, fibre channel (FC) technology may be used for transmitting data between the domains 12, 14 at high data rates which is especially suited for connecting computer servers to shared storage devices and for interconnecting storage controllers and drives. Some arrangements may also use fibre channel over an internet protocol (FCIP or FC/IP, also known as fibre channel tunneling or storage tunneling) that enables transmissions of fibre channel information by tunneling data between storage area network facilities over IP networks to facilitate data sharing over a geographically distributed enterprise. The storage domain 14 may also include FC or IP virtualization engines, host-based storage volume managers, FC or IP switches (with or without virtualization), tape devices, or other similar storage associated mechanisms.

Figure 2:
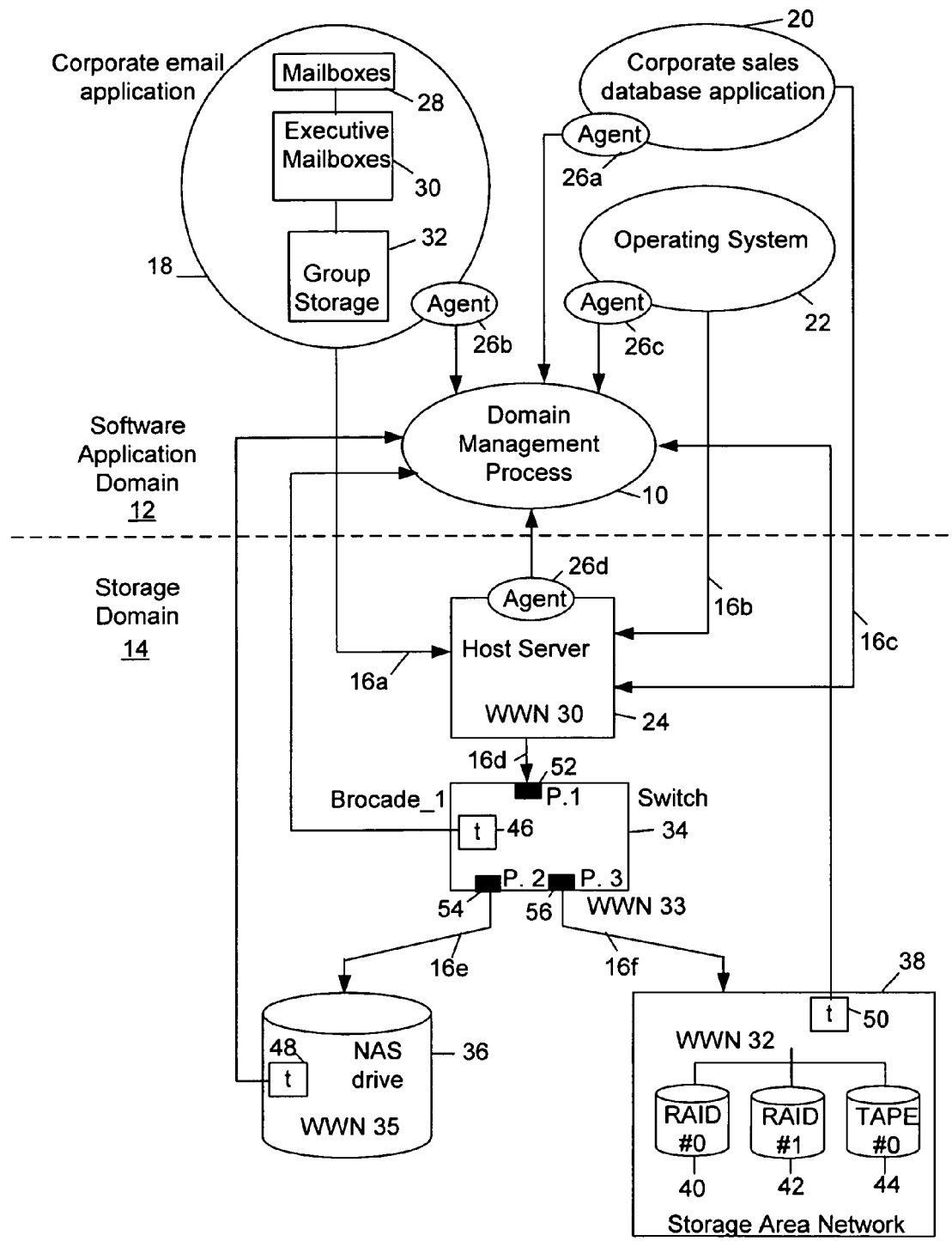
FIG. 2 is a block diagram depicting an illustrative example of the arrangement in FIG. 1.

Referring to FIG. 2, the domain management process 10 is contained within the software application domain 12 and monitors the configuration of the software application domain, the storage domain 14 and the data paths 16a–f between and within the domains. In this particular example, the software application domain 12 includes an email application 18 (e.g., MS Exchange) and a sales database application 20 for a corporation enterprise. The software application domain 12 also includes an operating system 22 that manages operations of a host server 24 that executes the email application 18 and the database application 20. In this particular example the host server is located in the storage domain 14.

In order to map the layout of the data paths 16a–f between and within both domains 12, 14, information including configuration data is collected by agents 26a–d from each of the applications 18, 20 and the operating system 22 in the software application domain. For example, one agent 26b connects to the email application 18 and another agent 26a connects to the database application 20. Each agent 26a, 26b provides data that represents the association between the respective application and connected software data paths 16a, 16b, 16c. The respective agents 26a, 26b also provide information representing the associations between data structures within the portion of the application that the agent is assigned. In this particular example, one agent 26b is assigned to the mailbox portion of the email application 18 that includes mailboxes 28 for all the employees of the corporation. One particular subset of the mailboxes 28 may be the corporate executive mailboxes 30 that contains and provides quick access to the email messages associated with the executives. Also in this particular example, the corporate executive email subset may also be stored in a group storage 32 that may store other subsets and is passed from the email application 18 to the storage domain 14 in order to save the contents (e.g., messages) of the mailboxes on a storage device included in the domain.

The agent 26b is in communication with the email application 18 and collects information that describes the associations between the email structures 28, 30, 32 and the associations between the application and the software data path 16a to the host server 24 in the storage domain 14. This collected association information is transmitted to the domain management process 10. The domain management process 10 uses this association information along with information from other agents and storage devices to map the relationships between the mailbox structures 28, 30, 32, the application 18, and the two domains 12, 14. Similarly the agent 26a is in communication with the corporation sales database application 20, and collects configuration information from the database application associated with sales application data structures and collects information associated with connections between the software data path 16c, the application, and the host server 24. The domain management process 10 uses this information to map the associations between the two domains 12, 14.

The operating system 22 provides commands to transfer data between the host server 24 and other portions of the storage domain 14 and has information that is collected by an agent 26c. This particular agent 26c gathers host-generic data from the operating system 22 and submits the information to the domain management process 10 for processing along with the information from the other agents 26a, 26b. Besides describing the software data path 16b between operating system 22 and the host server 24, the information also contains management data attributes such as a host file system configuration for both SAN and NAS file systems, host server usage statistics, host server adapter information (Fibre Channel, ISCSI and SCSI), along with the particular version of the operating system 22.

Information describing the associations between the components included in the storage domain 14 is collected and transferred to the domain management process 10 for processing with the information collected from the software application 12 domain. The components of the storage domain 14 provide a storage hierarchy and structure for storing the data passed from the email application 18 and the database application 20 to the storage domain 14 for storage. In typical operations, data passes over the software data paths 16a, 16c from the respective applications 18, 20 to the host server 24 and the host server 24 determines the storage location and the particular data path for transferring the data. For storing, the data is transmitted from the host server 24 to a switch 34 that directs the data, in this particular example, to either a network-attached storage (NAS) hard drive 36 or a SAN 38 that includes two redundant array of independent disks (RAID) 40, 42 and a tape storage system 44. In general, switch 34 provides connectivity for the host server 24 and the storage devices and the switch may range from entry-level to enterprise-level depending on the business requirements. In some arrangements two or more interconnected switches may be used to produce a SAN fabric that provides optimum SAN performance, scalability, and availability. In addition, SAN 38 may support disk mirroring, backup and restore, archival and retrieval of archived data, data migration from one storage device to another, and the sharing of data among different servers on a network. Also, in some arrangements SANs can incorporate subnetworks with NAS systems. SANs, such as SAN 38 enable more efficient use of storage capacity by consolidating widely distributed disk space onto fewer storage arrays that are accessible by heterogeneous servers across the SAN. This improves storage resource utilization by allowing excess storage capacity from one application to be used for another. The SAN 38 can provide better return on capital expenditure for storage and servers, greater configuration flexibility, and reduced management costs through centralization.

As mentioned, agents 26a–c gather and transmit configuration data from the respective software applications 18, 20 and the operating system 22 to the domain management process 10. An agent 26d is also assigned to the host server 24 for gathering associations between the software data paths 16a–c, which connect the host server 24 to the application domain 12, and respective logical data path 16d (that is also a physical data path), which connects the host server to the components 34, 36, 38 included in the storage domain 14. Similar to the other agents 26a–c, after collecting the configuration information, the information is passed to the domain management process 10 for processing to determine associations with the information gathered from the other agents 26a–c. However, some components of the storage domain 14 such as the switch 34, the NAS storage 36, and the SAN 38 are not agent assignable for passing configuration information, such as the logical data paths 16e, 16f (that are also physical data paths) to the domain management process 10. To provide configuration information for these storage domain components 34, 36, 38, each component includes a respective table 46, 48, 50 that contains information for transferring to the domain management process 10. The respective tables 46, 48, 50 contain information such as identification numbers for the respective storage components 34, 36, 38 and their interconnections. For example, the table 46 associated with the switch 34 provides the world wide name (WWN) assigned to the switch (i.e. WWN 33) and the world wide name associated with the component connected to each port of the switch 34. In this particular example, port 1 52 is connected to WWN 30 (i.e., host server 24), port 2 54 is connected to WWN 35 (i.e., NAS drive 36) and port 3 56 is connected to WWN 32 (i.e., SAN 38). World wide names are 64-bit identifiers that are used to uniquely identify ports on a network during discovery and network initialization. With this WWN assignment information of the switch 34 and each WWN connected to each respective switch port, the domain management process 10 can map the associations of the switch 34 without collecting information from an agent. Also, since the table 48 included in the NAS drive 36 provides the WWN of the drive (WWN 35), along with the WWN of the connected devices, and the table 50 included in the SAN 38 provides the WWN of the SAN (WWN 32), along with connections, the domain management process 10 can associate the WWN's provided by the switch table 46, the NAS drive table 48 and the SAN table 50.

In some arrangements the storage domain 14 can contain one or more sub-domains that include the components of the storage domain. For example, the host server 24 can be included on in a host domain (not shown) or the switch 34 can be included in a switch domain (also not shown). Further, the NAS drive 36 and the SAN 38 can be included, for example, in a subsystem domain (not shown).

Also in some arrangements the domain management process 10 may include reception processes (not shown) that are in communication with respective agents 26a–d to which the reception processes are assigned. In some arrangements the reception processes can also be assigned to particular sub-domains (e.g., host domain, switch domain, subsystem domain, etc.) to communicate with one or more agents in the respectively assigned sub-domain. These reception processes can also be assigned to the components in the storage domain 14 that are not agent-assignable (e.g., switch 34, NAS drive 36, SAN 38). Once assigned to one or more of these components, the reception porcesses can receive information (e.g., tables 46, 48, 50) from the components. The domain management process 10 may also produce and maintain one or more tables, from the information collected, to identify the components included in the storage domain 14. The tables may also maintain a listing of the connections and associations between the components in the storage domain or sub-domains.

In some arrangements the domain management process 10 may store a portion of the information collected from the agents 26a–d and the storage domain components 24, 34, 36, 38 in an information repository (not shown) that may reside in the domain management process 10 or on one or more of the components in the storage domain 14. This information can also be stored in one or more tables and retrieved from the tables to determine the software, physical, and logical data paths among components of the software application domain 12 and the storage domain 14.

In some arrangements host bus adapters (HBAs) connect the host server 24 to the switch 34 and each HBA is often assigned a unique WWN by the manufacturer that is encoded in non-volatile memory of a HBA controller included with each HBA. HBAs typically include hardware and drivers that interface with operating systems to represent fibre channel storage as devices in the operating system. HBAs also often negotiate with one or more connected switches along with other devices attached to a network and provide processing capabilities that minimize CPU overhead on the host server 24.

Figure 3:
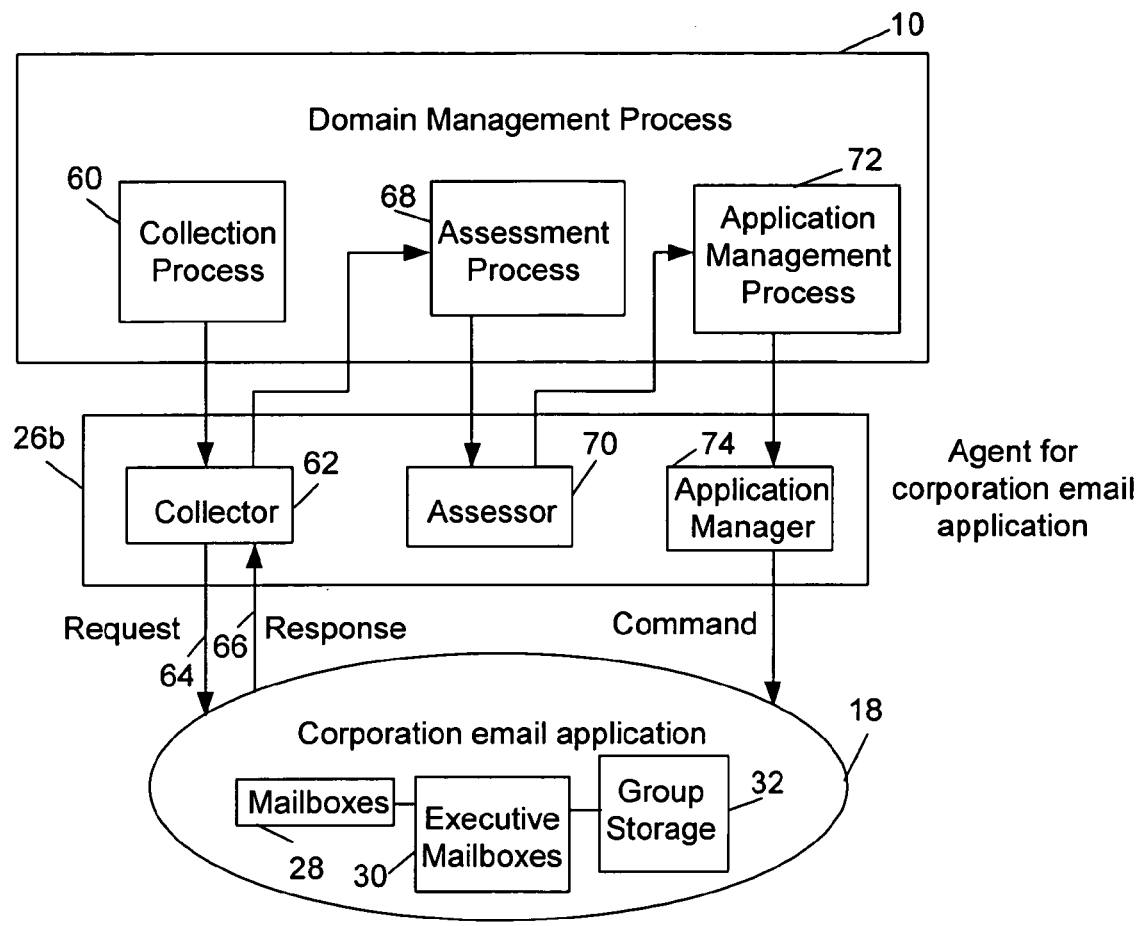
FIG. 3 is a block diagram of domain management process, agent, and a software application.

Referring to FIG. 3, the agent 26b associated with the mailboxes of the email application 18 is shown in communication with the application and the domain management process 10. In general the agent 26b is a program that gathers information from the email application 18 mailboxes or performs other services typically as a background type of process. The agent 26b also monitors different aspects of the entity under its control, assesses the status of the entity based on information collected, and uses one or more predefined management policies or rules in order to determine which action(s) to perform based on the policies. Typically, the agent 26b uses parameters provided by the user and gathers information from the assigned application and presents the information on a periodic basis to the domain management process 10. As mentioned the agent 26b is responsible for one type of application object (i.e., the email mailboxes). Often agents are implemented in Java and are supported by the code of the application to which the agent is assigned.

As mentioned the email application 18 includes objects 28, 30, 32. Once the agent 26*b* is assigned to the email application 18 a collection process 60 directs the agent 26*b* to collect data from the email application 18. In particular, the collection process 60 directs a collector 62, included in the agent 26*b*, to determine what configuration data should be collected from the email application 18 while avoiding unnecessary data collection. Once the collection process 60 determines the data sought, the collector 62 is directed to transmit a request 64 to the email application 18 and receive a response 66 that contains the data. In some arrangements, collector 62 examines a boolean parameter present in the email application 18, which changes logic level when data is present for collection. Typically the collector 62 has a short execution period so that execution is completed within the predetermined cycle time of the collection process 60.

After the application response 66 is received by the collector 62, information is passed to an assessment process 68 that is responsible for assessing aspects of the assigned email application 18, recording the assessment results in a database, and passing assessment results on to an assessor 70. Most of the business logic resides in the assessment process 68. In some arrangements business logic prioritizes events associated with the assigned application based on business importance. For example if storage is limited, the business logic in the assessment process 68 may determine that the executive mailboxes 30 are to be stored in the limited storage while the mailboxes for all the employees 28 is not to be stored because they are less important to the business. In some other arrangements the business logic may be based on other principals such as design principals. For example, the assessment process 68 may determine to only store the messages of the executive mailbox 30 because the large volume of messages for all the employees 28 may create potential storage problems. The assessment process 68 is controlled by a hierarchy of thresholds and switches in a policy system (e.g. business logic) and the assessment process can use various implementations to assess the particular responses from the email application 18. Once the assessment process 68 has determined if the assigned application is to be reconfigured, assessment results are stored in an assessor 70, which is included in the agent 26*b*. The assessor 70 then provides the assessment results to an application management process 72. The application management process 72 uses the assessment results to direct an application manager 74 to alter the configuration of the application 18. For example, the application manager 74 can alter the configuration of the email application 18 such that the email messages from the executive mailboxes 30 are stored in a different storage device. In another example, the application management process 72 may direct the application manager to alert (e.g., send an email message, send a page, etc.) a system administrator of the application 18 status. In some arrangements, the assessment process 68 is constrained to execute relatively quickly, use inputs only provided by the collector 62, and store assessment results in the assessor 70.

In another arrangement, the domain management process 10 (shown in FIG. 2) can include a policy manager process (not shown) that defines the policies and rules that are used to determine if an event associated with an application in communication with the domain management process 10 has occurred. An event is detected if one of the policies or rules has been violated or possibly not violated. Policy filters (also not shown) may be included in the policy manager process to determine which components of the domains 12, 14 (shown in FIG. 2) should have the policies and rules applied. These policies and rules can be stored in a database in an accessible format such as an XML file. The policy manager process may also execute the policies and rules on a pre-determined schedule, on user demand, on receipt of an event, or other similar process.

Once an event has been detected and possible action taken, the policy manager process can report the event to the user. These events can be generated based on a component of one of the domains 12, 14 and typically the event is stored in an event repository. For example an event can be to notify the administrator to replace a component due to failure of a subsystem drive, fan, or I/O card. In another example, an event can alert the system administrator that a port on a particular component has failed. The domain management process 10 may also be the basis to generate the events. For example, the domain management process 10 may determine that a certain resource or component has reached a dangerous level (e.g., the storage capacity of a storage device is nearly filled) or the process may determine that a particular agent is not functioning correctly. Also, once an event has been detected, the event may be stored and its association with other events tracked over a period of time.

The domain management process 10 is responsible for execution control of all agents, including the agent 26*b*, and periodically cycles through the agents. The domain management process 10 is also responsible for calling the collection process 60 relatively soon after calling the agent's assessment process 68. Because the collection process 60 may check a database to determine what data may have already been collected, it can be more efficient for the domain management process 10 to invoke all the collection processes for a managed application instance before calling any of the assessment processes. The domain management process 10 also receives reconfiguration requests from the assessor 70 so that the application management process 72 is executed to direct the application manager 74 at the appropriate times and in the appropriate priority order. Some application managers may run for hours through many collection and assessment cycles. Also among the responsibilities of the domain management processes 10, responsibilities include: invoking each agent's collector once each cycle, invoking each agent's assessor once for each cycle, invoking each agent's collector before its assessor, scheduling each application manager as requested, not overloading instances with application managers, not missing collection or assessment because of running application managers, maintaining regular collect/assess cycle timing, and running application managers in the order defined by the priorities established by the assessors.

The assessor 70 identifies issues from the assessment results and schedules application managers to deal with them. To identify the issues, the assessor 70 may be organized with conditionals to determine if particular parametric actions should be taken. The assessor 70 also decides which alternative actions to take, when to take them, and with what parameters. In some arrangements, the assessor 70 may include a process to diagnosis the issues and a problem solver process to define the course of action. However, as shown in the figure, the assessor 70 may be a single entity and may be used in solving problems such as performance problems with no obvious cause. In some arrangements, the reconfiguring by the application manager 74 may include scripted sequences of actions, however, for more difficult problems the script may be generated by the assessor 70.

Since this particular agent 26*b* is assigned to the mailboxes 28, 30, 32 of the email application 18, the agent would typically collect the current free memory space from the mailboxes and alert an email administrator if the memory space is nearing capacity. Other separate agents may also be associated with the email application 18 and, for example, alert the administrator that a public folder store is nearing capacity, or when a particular service is being executed by the email application 18. One or more agents may also scan the mailboxes and public folder stores for corrupt messages or files and prompt the email administer to delete the corrupted items or allow them to remain. An agent associated with the email application 18 may also help collect vital information from one or more servers, such as CPU utilization, memory utilization, and whether the server is online or down. An agent may also aid in the evaluating of storage performance. For example, an agent may monitor the rate at which storage is growing, or measure the time period until an overall email store reaches capacity, or even measure the time period for data to transfer from the host server 24 (shown in FIG. 2) to a storage device in the storage subsystem.

Figure 4:
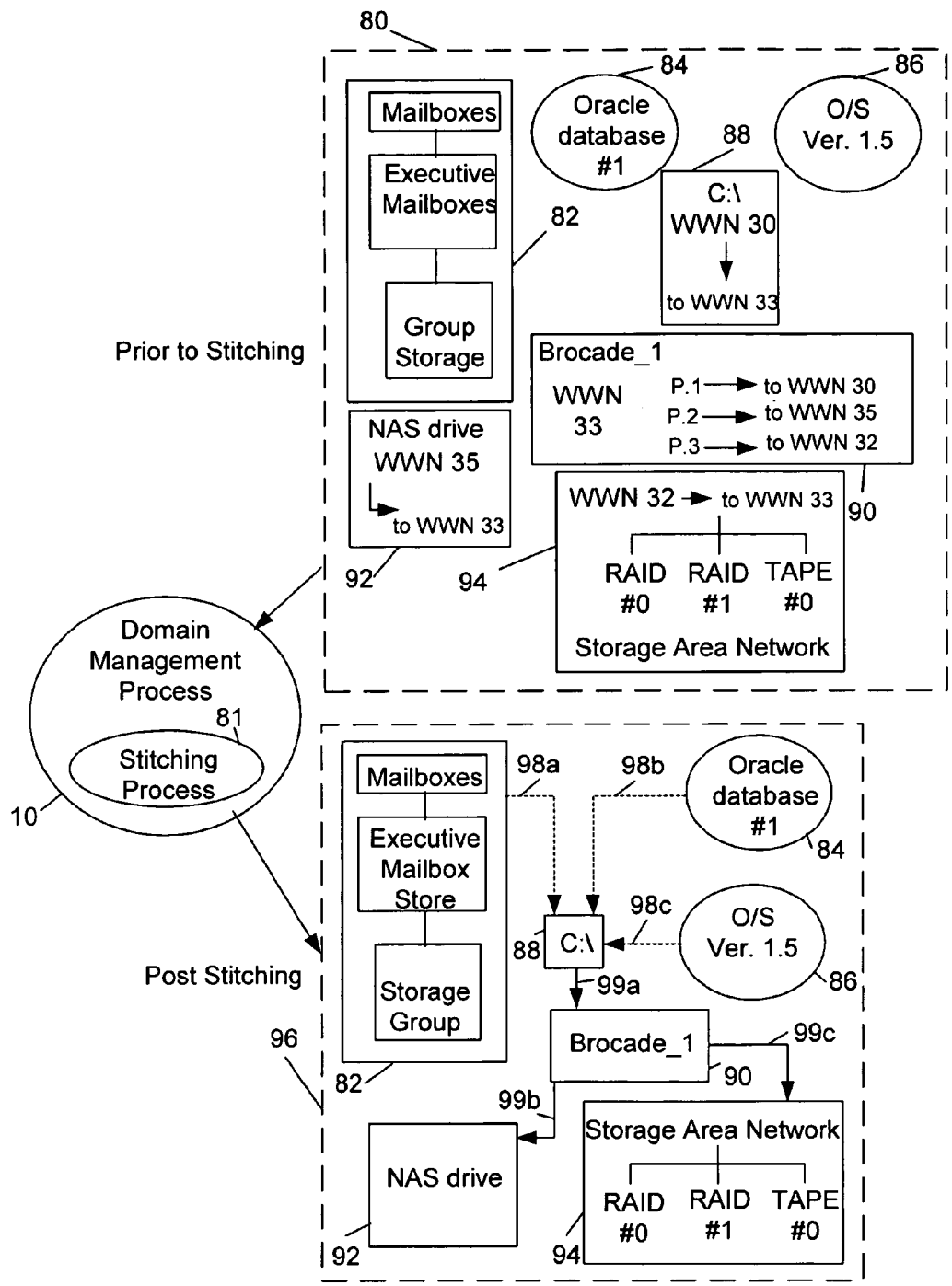
FIG. 4 is a block diagram of information passed to a stitching process and information processed by the stitching process.

Referring to FIG. 4, the information 80 collected by the agents 26*a–d* (shown in FIG. 2) and included in the tables 46, 48, 50 (also shown in FIG. 2) of the components of the storage domain 14 is represented. For example, the mailbox hierarchy 82 collected by the agent 26*b* associates with the mailboxes of the email application 18. Also, a name 84 identifying the executing sales data base was collected by the agent 26*a* associated with the corporation sales data base application 20. The O/S version 86 was collected by the agent 26*c* associated with the operating system 22 and the agent 26*d* assigned to the host server 24 provides the label (i.e., "C:\"), also known as a mount point, and world wide name 88 (WWN 30) of the host server along with the WWN (i.e., WWN 33) of the device connected to the host server. The respective tables 46, 48, 50 from the switch 34, the NAS drive 36, and the SAN 38 (each shown in FIG. 2), provide labels and the world wide numbers 90, 92, 94 assigned to the three storage domain components along with the respective WWNs of connected components.

This collected information is transmitted to a stitching process 81, which may reside in the domain management process 10. The stitching process 81 determines the software data paths between the software application domain 12 (shown in FIG. 2) and the storage domain 14 (also shown in FIG. 2) and the software data paths within the application domain. The stitching process 81 also determines the physical and logical data paths extending within the storage domain. Since the email application 18 and the sales database application 20 (also shown in FIG. 2) are executed on the host server 24, software data paths connect the applications and the server. Also, since the storage domain components 24, 34, 36, 38 (shown in FIG. 2) store the WWNs of connected components, physical data paths between the storage domain components, which are also logical data paths in this example, may be determined. For example, the information 90 associated with the switch provides that switch port 1 is connected to a device with WWN 30, switch port 2 is connected to a device with WWN 35, and switch port 3 is connected to a device with WWN 32. So, from this information, and the labels associated with the information for the other components in the storage domain, the stitching process 81 can determine that switch port 1 is connected to host server "C:\" 24, switch port 2 is connected to the NAS drive 36, and switch port 3 is connected to the SAN 38.

Once the information 80 is received by the stitching process 81, the information is processed into a map 96 of the software, physical, and logical data paths between each of the components in the software application and storage domains. By stitching the appropriate interconnections of both domains, the map 96 may be displayed by the domain management process 10 to a user for analyzing the interconnections and, for example, to determine replacement component positions, insertion positions for new components, or re-arranging the currently displayed data paths. As shown the software data paths 98*a–c* are represented with dashed-lines between the applications, the operating system, and the host server "C:\". Logical data paths 99*a–c* are represented with respective solid-lines and extend between the host server, the brocade switch, the NAS disk drive, and the SAN. By stitching a map 96 of the data paths of both domains the user is provided a complete layout of the applications and storage system components and may use the stitched information to model and analyze the addition of new components to the domains or the replacement of current components and measure the performance of the altered domains.

In some arrangements, the stitching process 81 may receive information associated with software, logical, or physical data paths to an unknown device. In such as case, a generic device (not shown) is assigned, the stitching process 81, to the particular data path.

Figure 5:
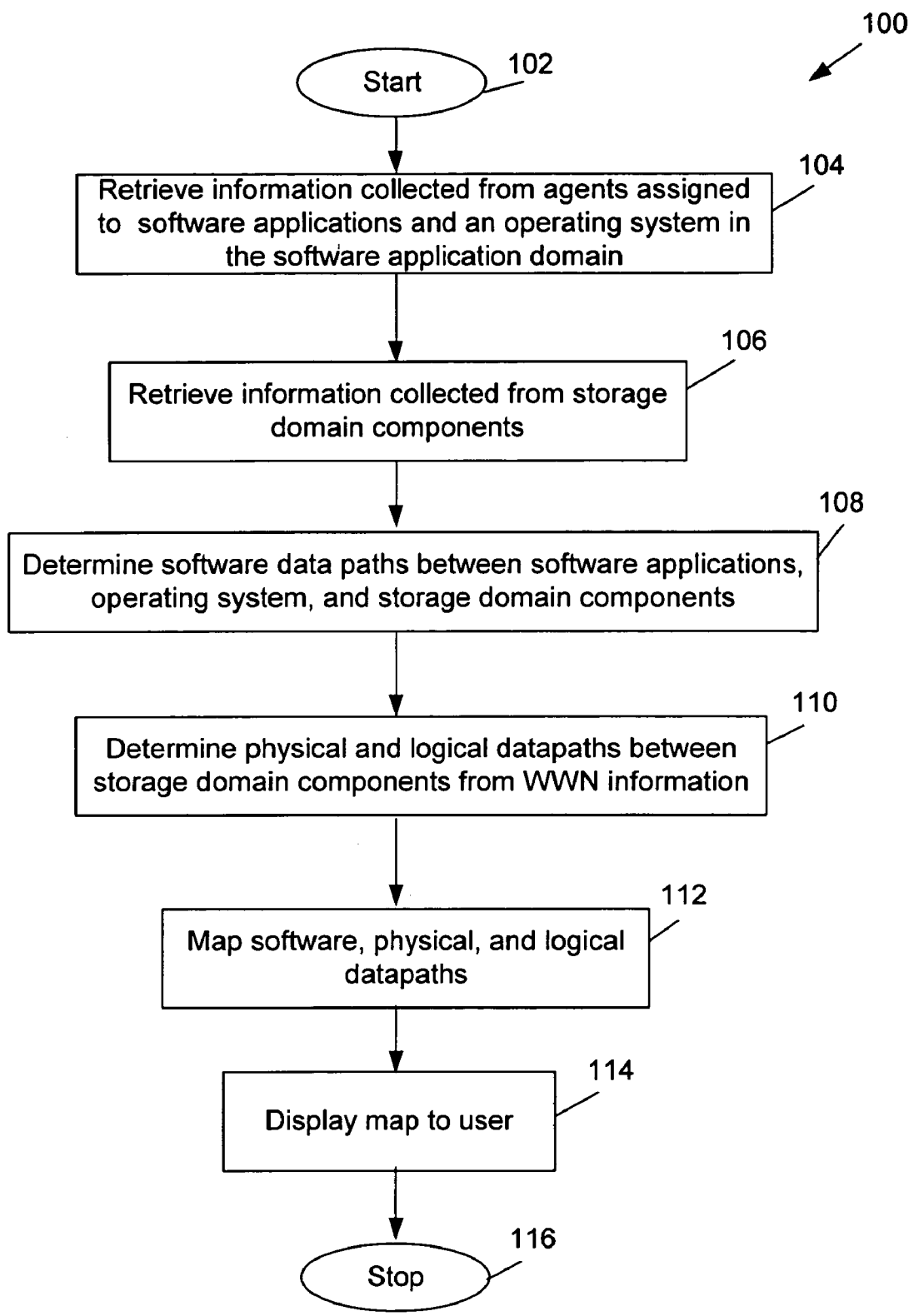
FIG. 5 is a flow chart of a stitching process.

Referring to FIG. 5, a process 100 for stitching data paths between the software application domain 12 (shown in FIG. 2) and the storage domain 14 (also shown in FIG. 2) is shown. The process 100 starts 102 and retrieves 104 information that was collected by agents assigned to software applications and an operating system that are present in the software application domain 12. This information can include an identifier for each application and the operating system and also identifies the server that executes the applications and operating system. The stitching process 100 retrieves 106 information that was collected from the components of the storage domain 14. As shown in FIG. 2, these components may include a host server, a switch, and one or more storage mechanisms such as a NAS drive or a SAN. The retrieved information can include the WWN of each component along with any lists that report WWNs of connected components. After retrieving the stored information 104, 106, the stitching process 100 determines 108 software data paths between the applications, the operating system, and the components of the storage domain. After determining 108 the software data paths, the stitching process 100 determines 110 the physical and logical data paths between the storage domain components by comparing the WWN information collected from the components. Once the physical and logical data paths have been determined 108, 110, the stitching process maps 112 the software, physical, and logical data paths among the applications, operating system, and storage domain components. After mapping 112 the data paths, the stitching process 100 displays 114 the map to a user for analyzing the data paths between the software application domain and the storage domain. Once the map is displayed 130 to the user, the stitching process 100 stops 116.

Figure 6:
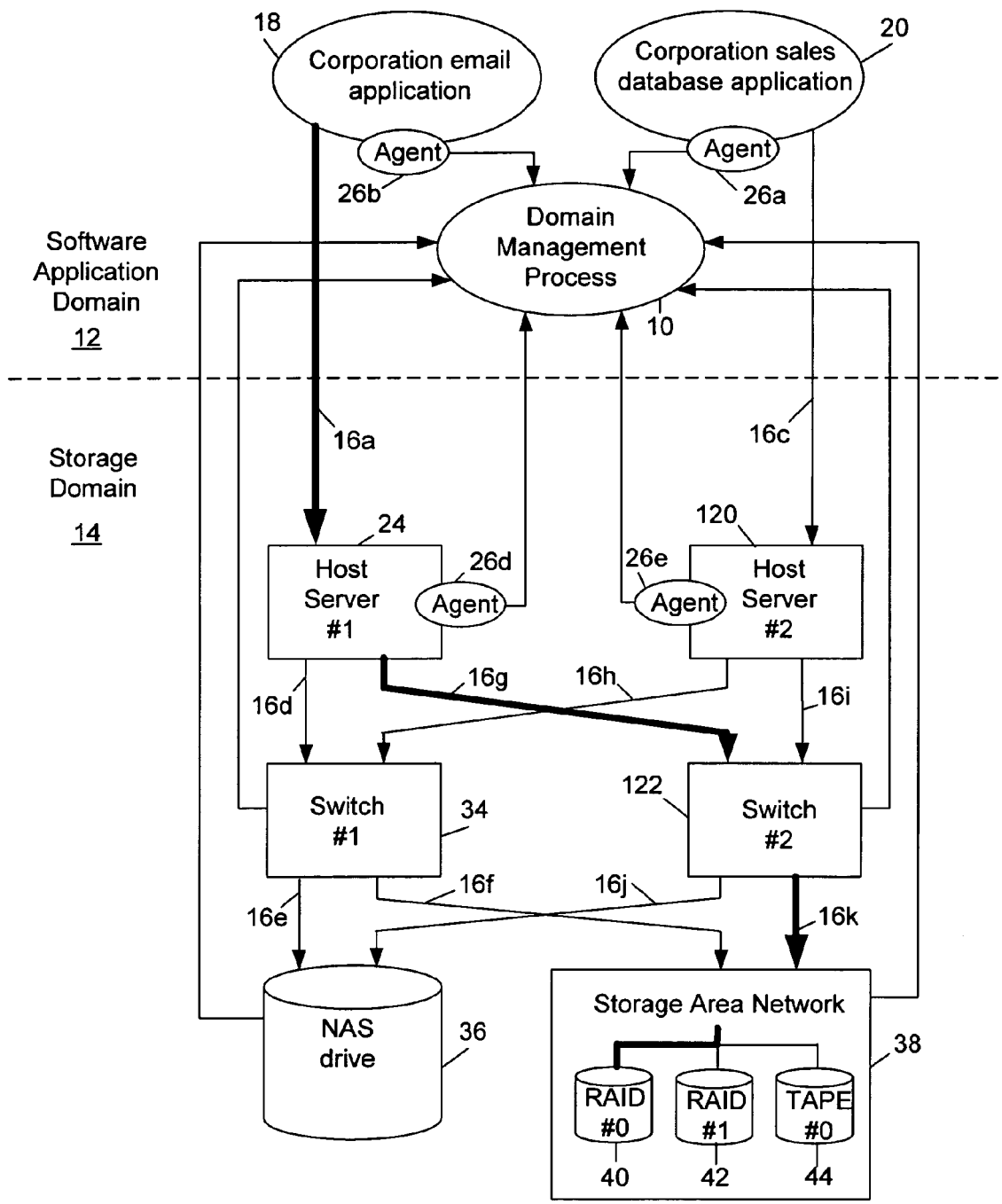
FIG. 6 is a block diagram of another example of a software application domain and a storage domain, and a domain management process.

Referring to FIG. 6, in another example of the two domains, which includes more storage components, the corporation sales database application 20 is now executed on a second host server #2 120, and an agent 26*e* is assigned to host server #2 and provides the domain management process 10 with information regarding the data paths between the database application and the second host server along with the data paths between the second host server and the other components in the storage domain 14. Both host server #1 24 and host server #2 120 have respective physical data paths 16*d*, 16*g*, 16*h*, 16*i* that respectively lead to switch #1

34 and a second switch (#2) 122. Also switch #1 34 and switch #2 122 are connected to the NAS drive 36 and the SAN 38 by respective physical data paths 16e, 16f, 16j, 16k. All of these data paths 16d, 16g, 16h, 16i, 16e, 16f, 16j, 16k allow both host servers 24, 120 to pass data across either switch #1 34 or switch #2 122 to either the NAS drive 36 or the two RAIDs 40, 42 or the tape drive 44 of the SAN 38. Similar to FIG. 2, each of the physical data paths 16d–k are configured to be logical data paths. Also similar to FIG. 2, the software, logical, and physical data paths may be determined by the domain management process 10 from the information provided by the agents 26a, 26b, 26d, 26e and the information provided by switch #1 34, switch #2 122, the NAS drive 36, and the SAN 38. Once the respective information is collected, the data paths can be stitched by the stitching process 100 (shown FIG. 5) that is included in the domain management process 10 and a map containing the components of the software application domain 12 and the storage domain 14 may be displayed to the user.

Once the map is displayed, the user can select a particular entity in either domain, a particular data path, a portion of one or both domains, or both entire domains for analysis. In this particular example, a data path from the email application 18 to the RAID #0 40 is shown (by bold lines) to have been selected. The software data path 16a extends from the email application 18 to the host server #1 24 that executes the application. A logical data path 16g then extends from the server 24 to switch #2 122 and the selected path then extends across the logical data path 16k to the SAN 38 and terminates at the RAID #0 40. By selecting this particular path a user can have the selected data path characterized, by the domain management process 10, while taking into account both the email application 18 in the software application domain 12 that initiates the selected data path and the components (i.e., host #1 24, switch #2 202, SAN 38, and RAID #0 40) of the storage domain 14 that are included along the user selected data path.

To analyze the selected data path, the domain management process 10 includes a characterization process for computing characterization measures from the information passed by the agents 26a, 26b, 26d, 26e and the storage components 34, 36, 38, 202 without agents. For example, a performance measure may be calculated to determine the selected data path throughput (i.e., amount of data moved in a time period in mega-bits per second) from the email application 18 to the RAID #0 40. In some arrangements performance may also be a measure of the total effectiveness of the selected data path, including throughput, individual response time, and availability.

Another characterization measure that may be calculated is the availability of the selected data path. Availability can be defined as the accessibility of input and output ports and is used to describe products and services that ensure that data continues to be available at a required level of performance in situations ranging from normal through "disastrous". In general, availability is achieved through redundancy involving where data is stored and how it can be reached. Often availability can be measured in terms of how often data is available. For example, a data path may provide 99.999 percent availability, or in another example, availability may be measured by the amount of data flow through the data path at a particular time (e.g., 3200 megabytes per second).

By measuring recoverability of the selected data path, the connected storage device is characterized for the capability to retrieve stored data. In this particular example, the RAID #0 40 recoverability may be determined by the domain management process 10 from a manufacturer error rate that is provided by the RAID #0. Cost may also be measured from the information passed to the domain management process 10 regarding the selected data path. Often when an application malfunctions or is shut down, a downtime cost in dollars per hour is associated to the application. For example, if the email application 18 for the corporation malfunctions and is brought off line, the corporation may experience a loss of $50.00 per hour due to this application downtime. Or in another example, if the sales database application 20 malfunctions and is placed off line, the corporation may experience a loss of $500.00 per hour. Also, these downtime costs in dollars per hour cost for a malfunctioning application can vary as a function of time. For example, during the holiday season the downtime cost of the sale database application 20 may greatly increase, for example, to $10,000 per hour while the downtime cost of corporation email application may decrease to $20.00 per hour due to the number of employees on vacation. So, downtime cost, which is calculated by the domain management process 10 for the selected data path, may vary over a particular time of year.

Another characterization measure that may be calculated by the domain management process 10 for a selected data path is the security level. In this particular example, information passed from SAN 38 to the domain management process 10 contains a measure of the susceptibility that data stored on RAID #0 40 may be improperly retrieved without proper authorization. In characterizing the security level, access to the domains 12, 14 or portion of the domains may be dependent upon the role of the domain management process user (e.g., the company CIO, different administrators, help desk employees). The access to the domains 12, 14 or portions of the domains may also be limited by the organization to which the user is a member. In some arrangements, besides limiting access based on users, access can also be based on the domains 12, 14, portions of the domains, or components of either domain (e.g., a particular application in the software application domain, a host server in the storage domain, etc.). Access may be limited based on a component, such as, only allowing a user to view a component on a display or allowing access such that user can access the characteristics of the component or execute an analysis on the component, or other similar control function.

So the domain management process 10 may compute, for example, a performance, availability, recoverability, cost, and security measure to characterize the selected data path. These characterization measures may also be calculated for any other similarly selected data path, or portion of the software application domain 12, the storage domain 14, or a combination of both domains.

Figure 7:
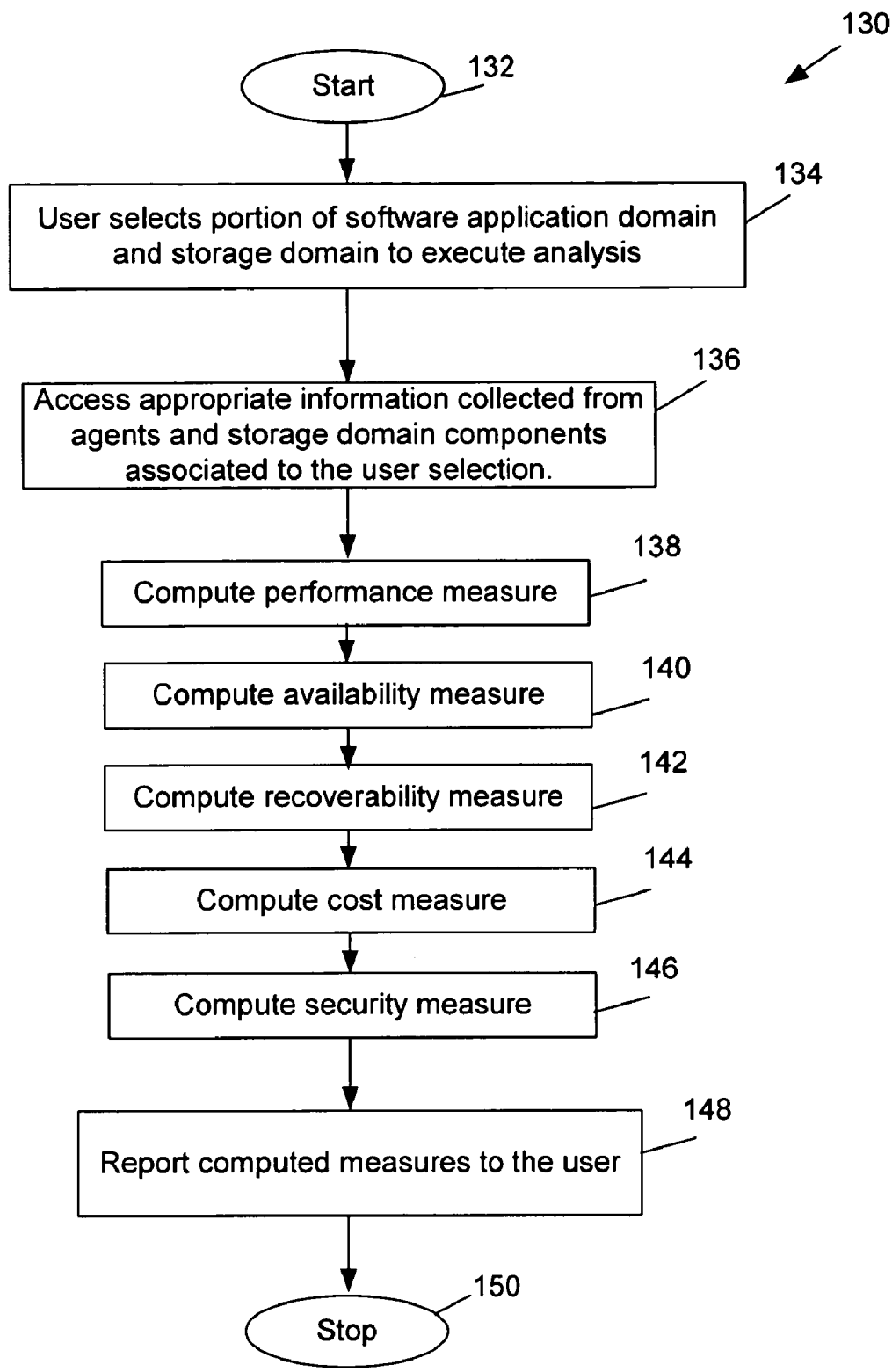
FIG. 7 is a flow chart of a characterization process.

Referring to FIG. 7 a characterization process 130 that may be included in the domain management process 10 (shown in FIG. 6) is shown. The characterization process 130 starts 132 when a user selects 134 a portion of the software application domain 12 (shown in FIG. 6), the storage domain 14 (also shown in FIG. 6), or a combination of the two domains. After the user selection 134, the process 130 accesses 136 the appropriate information that was collected from the agents and storage components of the software application and storage domains 12, 14 associated with the portion selected by the user. Referring briefly to FIG. 6 as a demonstrative example, the information accessed by the process 130, for this particular user selection, would relate to the email application 18, host server #1 24, switch #2 122, and the SAN 38. Returning to FIG. 7, once the appropriate information has been accessed 136, the process 130 computes 138 the performance measure, the availability measure 140, the recoverability measure 142, the cost measure 144, and the security level measure 146 associated with the user selection. After the characterization measures have been computed, the process 130 reports 148 the computed measures to the user prior to stopping 150.

Figure 8:
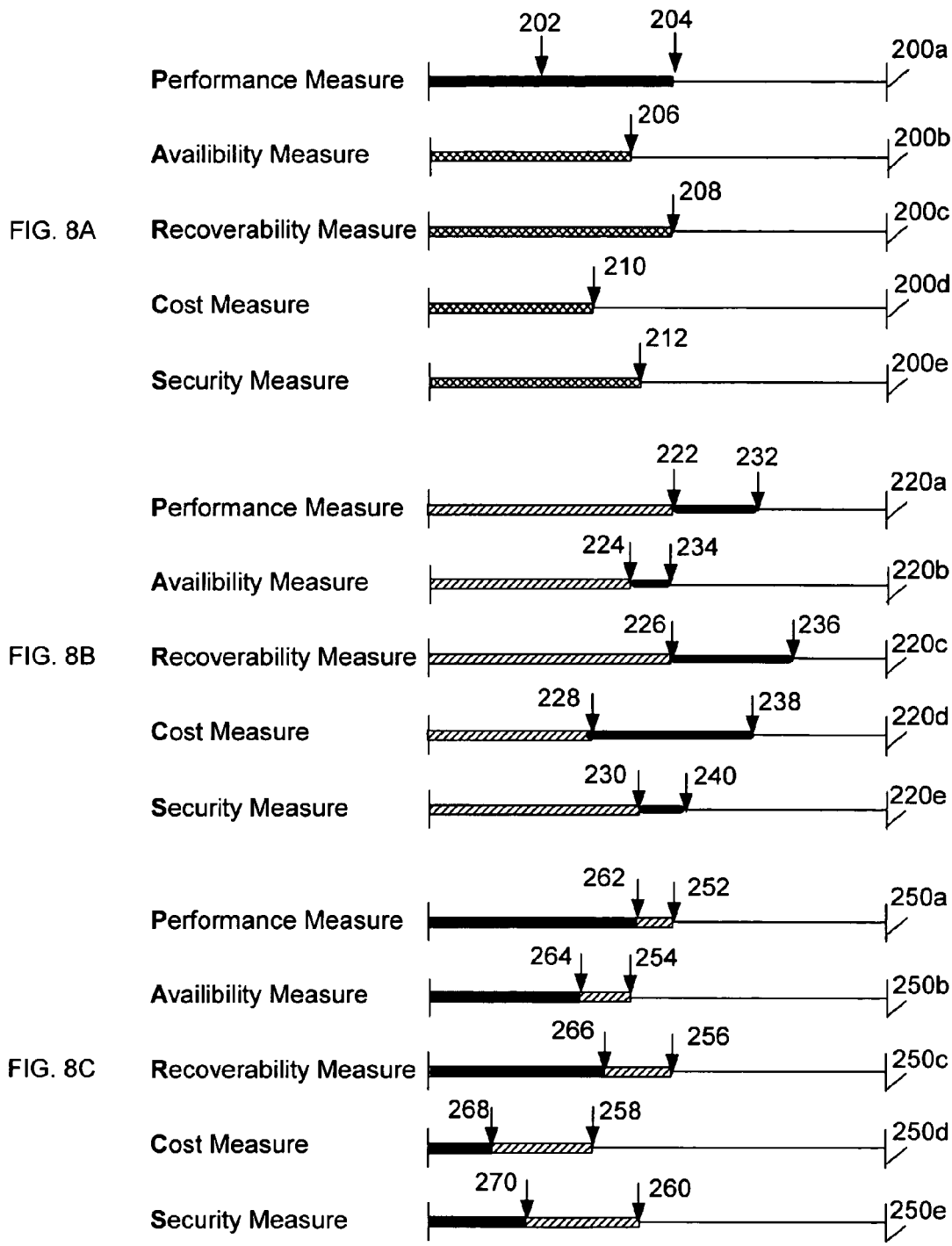
FIG. 8(a)–(c) represent five characterization measures.

Referring to FIGS. 8A–8C three sets of horizontal bar charts are shown that may be provided by the domain management process 10 to the user to represent the performance, availability, recoverability, cost, and security measures calculated by the process 130 (shown in FIG. 7) for the selected data path shown in FIG. 6. For each of the three sets of bar charts, the range of each bar chart increases as each chart extends from left to right and each chart is scaled in the appropriate units associated to the particular measure. For example, the performance measure may be scaled in units of megabytes per second while the cost measure may be scaled to units of dollars/hour for downtime.

Referring to FIG. 8A, after each of the five characterization measures are computed and displayed on the respective bar chart 200a–e, the user can alter the computed value of one characterization measure and the management domain process 10 (shown in FIG. 2) will re-compute the values for the other four characterization measures based on the altered value. In this particular example the user has increased the performance measure from one value 202 to a higher value 204. Based on this higher value 204 and the information associated with the selected data path (shown in FIG. 6), the management domain process 10 re-calculates the values for the other four measures and displays the values on the respective bar charts 200b–e. For example, for the selected data path to operate with a performance at the higher value 204, the minimum availability measure 206 is re-computed and displayed on the availability bar chart 200b. Correspondingly, the re-calculated minimum recoverability measure 208, minimum cost measure 210, and the minimum security measure 212 are displayed on the respective bar charts 200c–e. However, the re-computed values displayed the four bar charts 200b–e are minimum values and the higher performance value 204 may also be attained by operating the selected data path with higher values then the reported on the four bar charts 200b–e.

Referring to FIG. 8B, after the domain management process 10 (shown in FIG. 6) calculates the characterization measures associated with the selected data path (also shown in FIG. 6), the user can simulate an insertion, into the selected data path, of one or more applications in the software application domain 12 (shown in FIG. 6) or one or more components in the storage domain 14 (also shown in FIG. 6). For example, as shown in the figure each bar chart 220a–e displays the respective calculated values 222, 224, 226, 228, 230. In this particular example, the user uses the domain management process 10 to simulate inserting RAID #1 42 into the selected data path (shown in FIG. 6). Due to this simulated insertion, the performance of the selected data path, along with the other characterization measures, increase with respect to measures of the selected data path containing only RAID #0 40 (also shown in FIG. 5). Correspondingly, the domain management process 10 re-calculates the characterization measures to include the information associated with the newly inserted RAID #1 42 and the recalculated measures are displayed on the respective bar charts 220a–e. In this particular example, each of the characterization measure values increase and are shown on the bar charts by respective solid bars 232, 234, 236, 238, 240. Also, in this particular example the inserted RAID #1 42 was previously included in the storage domain 14 (as shown in FIG. 6), however in other examples the simulated components may not be previously included in either domain.

Referring to FIG. 8C, the domain management process 10 (shown in FIG. 6) may also be used to simulate replacing components included in either domain with different components to alter a selected data path. For example, referring briefly to FIG. 6, the domain management process 10 may simulate replacing switch # 2 122 with a lower performance switch. Once the user selects such a simulated switch replacement, the domain management process 10 recalculates the characterization measures and displays the new characterization measure values on the bar charts in comparison to the measures computed prior to the component replacement. Prior to replacing the switch, each of the characterization measure values 252, 254, 256, 258, 260 are calculated and are shown with hashed bars on respective bar charts 250a–e. After replacing the switch, the five characterization measures are recalculated and the new values 262, 264, 266, 268, 270 are displayed with solid bars on the respective bar charts 250a–e. In this particular example, since the switch is replaced by a simulated low performance switch the five characterization measures decrease on the respective bar charts 250a–e. Also in this particular example, a component in the storage domain 14 (shown in FIG. 6) was replaced by a simulation, however in other examples simulations may replace one or more components in either the software application domain 12 (also shown in FIG. 5) and/or the storage domain. Also, referring to FIGS. 8A–C, each of the functions may be performed individually or in combination.

Referring to FIG. 9, the domain management process 10 (shown in FIG. 6) can collect information from the software application and storage domains 12, 14 (also shown in FIG. 6) to calculate the performance, availability, recovery, cost, and the security measures over a particular time period. In this particular example, each of the characterization measures are calculated over a calendar year and displayed on x–y line charts 280a–e for the selected data path shown in FIG. 6. By displaying the characterization measures as a function of time, a user can determine peak activity periods along with slow periods and possibly adjust storage components and application assets to compensate for the activities during particular months. For example, as shown in the figure, the performance measure 280a of the selected data path, including the email application 18, has peak periods prior to the December holiday season and a slow period during the summer months. So, a storage system administrator may decide to use a high performance storage device for email mailbox storage for the peak usage time periods of the calendar year and switch in a lower performance storage device during the summer months when email traffic is in the lull period. Also, for example, by displaying the characterization measures the administrator can determine the proper time of year for general maintenance and upgrading of equipment in the particular data path selected by the administrator for analysis.

Figure 10:
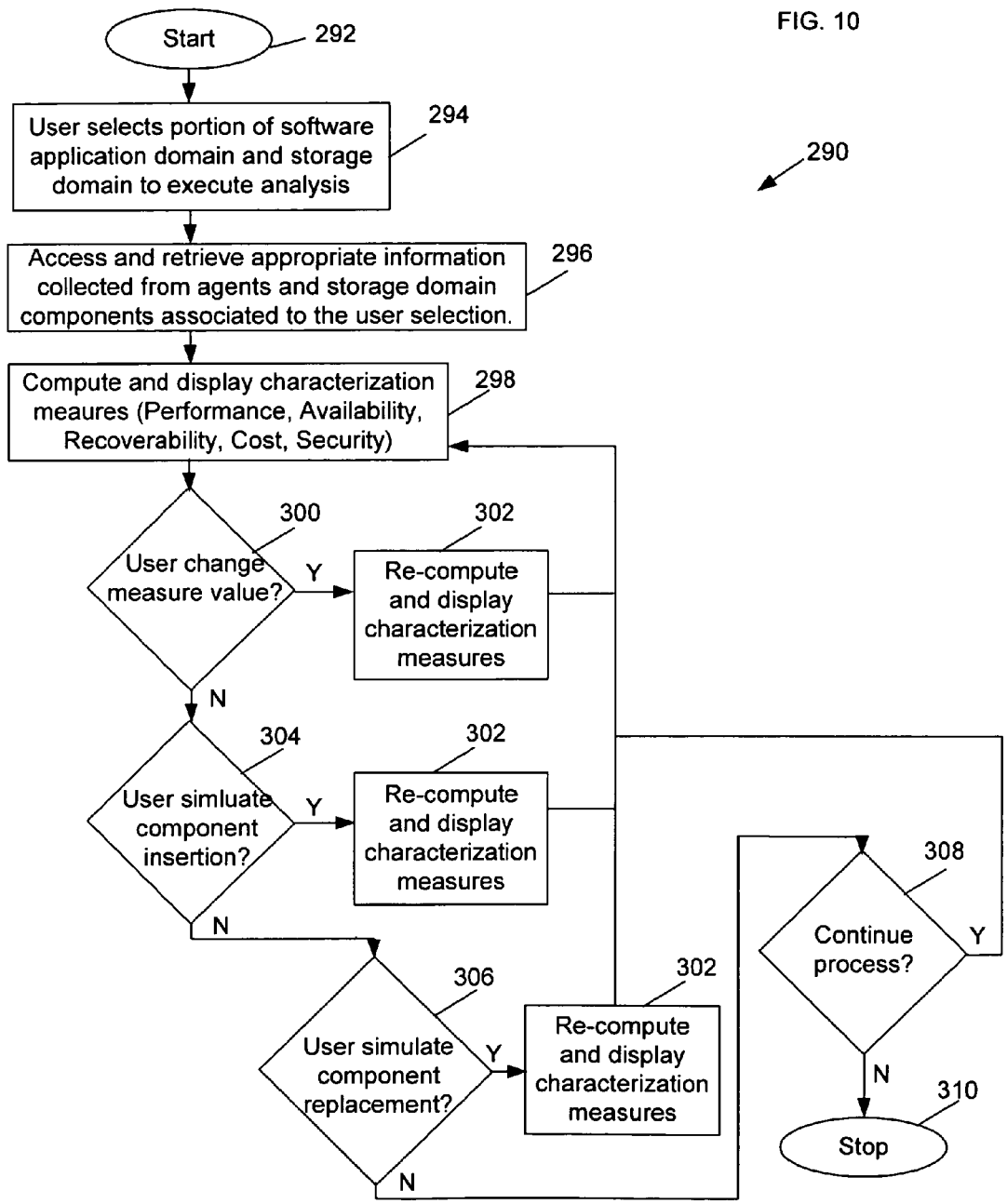
FIG. 10 is a flow chart for computing characterization measures.

Referring to FIG. 10, a characterization simulation process 290 that may reside in the domain management process 10 (shown in FIG. 6) is shown. The simulation process 290 starts 292 when a user selects 294 a portion of the software application domain 12 (shown in FIG. 6) or a portion of the storage domain 14 (shown in FIG. 6) or a combination of the two domains. As previously mentioned, for example, this selection may include a particular data path from an application to a storage device, or a particular component in the storage domain 14, or the entire enterprise that contains both domains. After the user selection 294 is made, the process 290 accesses 296 and retrieves the appropriate information collected from the agents and storage domain components associated with the user selection. Upon retrieving 296 the collected information, the process 290 computes 298 the five characterization measures (i.e., performance, availability, recoverability, cost, and security measures) based on the retrieved information for the user selection. After computing, the characterization measures are then displayed to the user for analysis. After computing and displaying 298 the five characterization measures, the process 290 determines 300 if the user has changed one of the displayed characterization measures, such as was described with respect to FIG. 8A. If the user had changed one of the characterization measures, the process 290 then re-computes 302 the other four characterization measures and displays the re-computed measures to the user. If the user has not altered one of the characterization measures, the process 290 determines 304 if the user has inserted a simulated component into the prior user selection. If a simulated component has been inserted by the user, the process 290 re-computes 302 the characterization measures based on the previously retrieved information and the insertion of the simulated component and displays the re-computed measures to the user. If the user has not inserted a simulated component into the selection, the process 290 determines 306 if the user has replaced a component or a portion of the user selection. If the user has replaced a component or portion of the selection, the process 290 recomputes 302 the characterization measures based on the previously retrieved information and the replacement component and displays the re-computed measures to the user. If the user has not replaced a component in the selection, the process 290 asks 308 the user if the process should stop. If the user decides to end, the process 290 is stops 310. But if the user decides to continue the process, the process 290 returns to computing and displaying 298 the characterization measures based on the current information and continues from this point.

Figure 11:
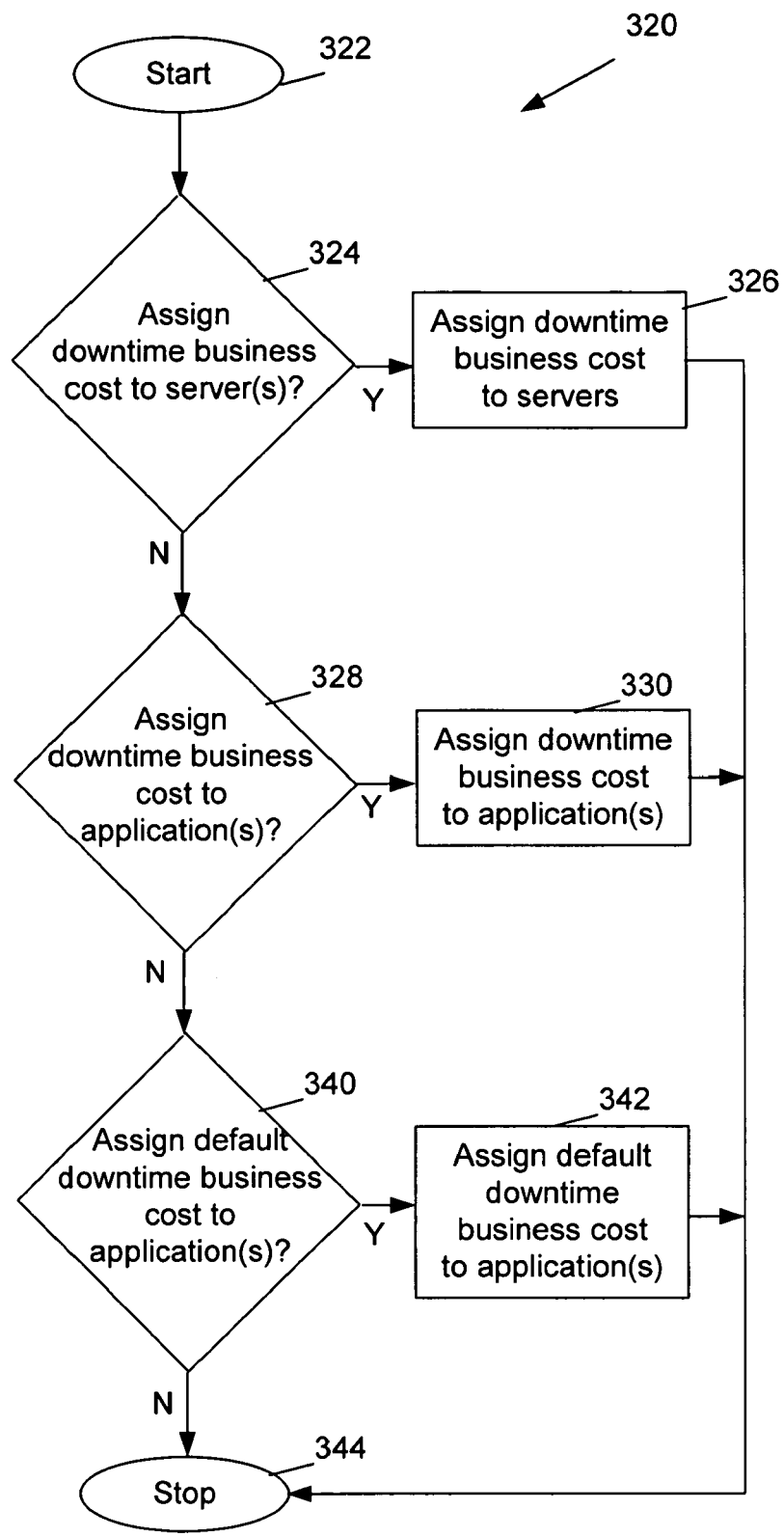
FIG. 11 is a flow chart for assigning downtime business costs.

Referring to FIG. 11, the information collected from both the application domain and the storage domain may also be used in risk analysis of the particular data path or other portion of the two domains selected by the user. By performing a risk analysis on the selection, potential risky configurations or operation environments may be detected. Again, briefly referring to FIG. 6, one possible selection is shown by the bold data path from the email application 18 through host server #1 24, switch #2 122, and ending in RAID #0 40 of the SAN 38 for data storage. Various types of risk analysis may be performed on this selected data path. For example, a risk analysis may be based on downtime business cost of the selected data path. To perform this particular risk analysis, one or more downtime business costs are assigned to storage domain 14 components and applications in the software application domain 12.

Returning to FIG. 11, an assignment process 320 is shown that may be included in the domain management process 10 (shown in FIG. 6) and that allows the user to assign one or more downtime business costs. The assignment process 320 starts 322 by determining 324 if the user is assigning downtime business costs to the host servers in the storage domain. Also referring briefly to FIG. 6, for this particular example, the user can assign the same or different downtime business costs to the host server #1 24 and host server #2 120. If the user is assigning downtime costs to the host servers, the process 320 assigns 326 one or more downtime costs, provided by the user, to the respective servers and then stops 344. If the user is not assigning a downtime cost to the server, the assignment process 320 determines 328 if the user is assigning business costs to the applications in the application domain 12 (shown in FIG. 6). For example, the user may assign a downtime business cost of $50/hour to the email application 18 (shown in FIG. 6) and a downtime cost of $500/hour to the sales database application 20 (also shown in FIG. 6). If the user is assigning a downtime costs to one or more applications, the process 320 assigns 330 the costs to the applications and then stops 344. If the user is not assigning a downtime business cost to the one or more applications, the process 320 determines 340 if the user is assigning a default downtime cost to all of the applications in the software application domain. For example, the user may assign a default downtime value of $10,000/hour to all the applications in the software application domain. If the user is assigning a default downtime business cost for all of the applications, the process 320 assigns 342 the default downtime business cost to each of the application and then stops 344. Note that the business costs assigned to the servers and the business costs assigned to the applications are mutually exclusive and if a particular server is assigned a cost, any cost assigned to an application on the server is ignored for the risk analysis. Also, although the downtime cost uses here are described in units of dollars per hour, other units may be assigned and used in the risk analysis.

Figure 12:
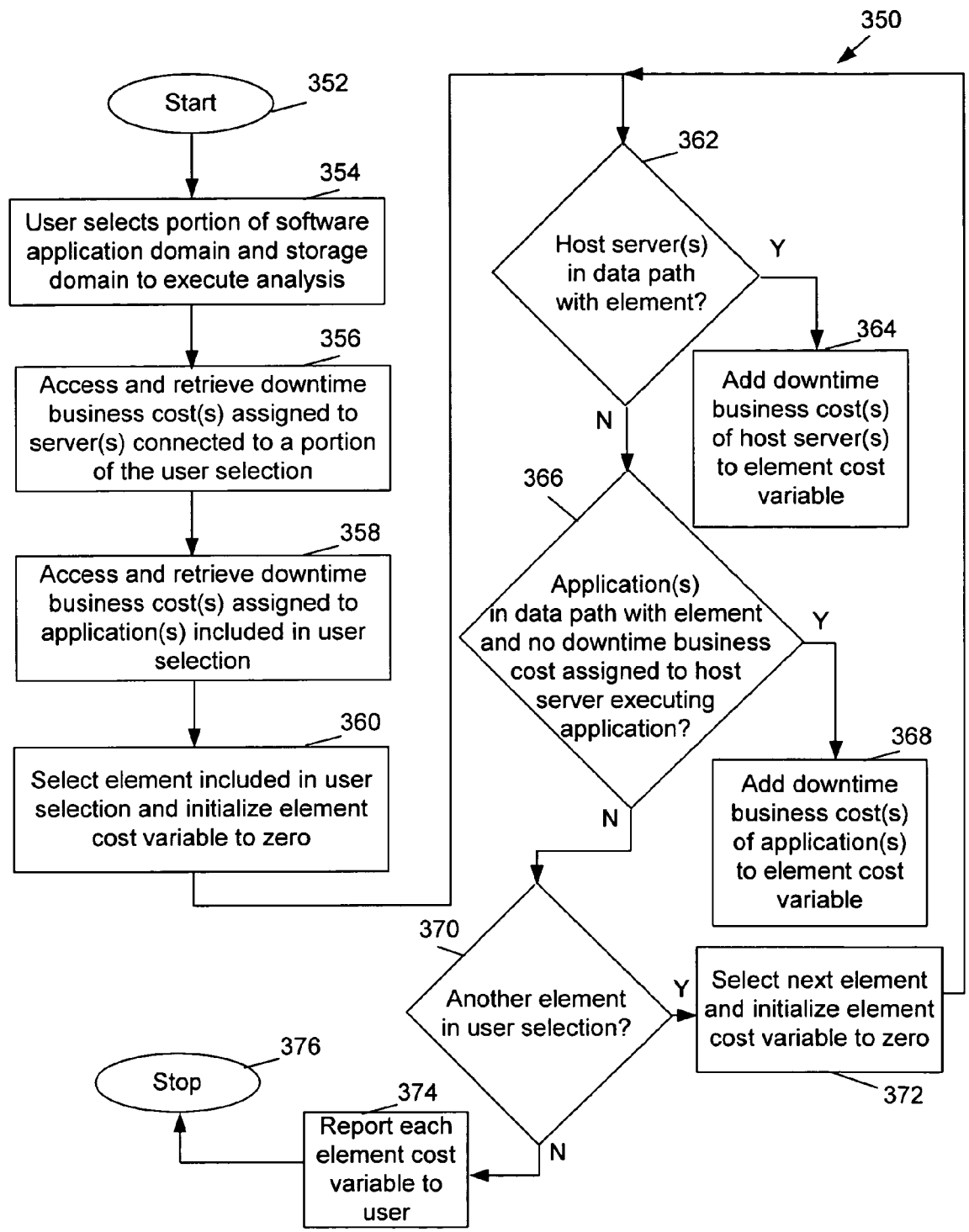
FIG. 12 is a flow chart for a downtime business cost risk analysis process.

Referring to FIG. 12, a downtime business cost risk analysis 350 process that may be included in the domain management process 10 (shown in FIG. 5) is shown. The risk analysis 350 processes starts 352 by the user selecting 354 a portion of the software application domain 12 (shown in FIG. 6) and the storage domain 14 (also shown in FIG. 6) for execution of the risk analysis. After the user selection 354 is made, the process 350 accesses and retrieves 356 the downtime business cost(s) assigned to the one or more host servers that are connected to any portion of the user selection. Upon retrieving 356 the downtime business cost(s) of the connected host servers, the risk analysis process 350 accesses and retrieves 358 the downtime business cost(s) assigned to the one or more application(s) present on any data path included in any portion of the user selection. After retrieving 358 the cost(s) for the one or more applications, the risk analysis process 350 selects 360 one of the elements (i.e., a switch, a SAN, etc.) included in the user selection and initializes a cost variable associated with the element to zero. Next, the process 350 determines 362 if the element is in any data path with a host server. If the element is in a data path with a host server, the process 350 adds 364 the downtime business cost of all the host servers on one or more data paths with the element to the element cost variable. After summing these one or more downtime business costs, the process 350 determines 366 if an application is in any data path with the selected element and if so, is there no downtime business cost assigned to the particular host server executing the application. If an application is in a data path with the element and no downtime business cost is assigned to the host server executing the application, then the process 350 adds 368 the downtime business cost, assigned to each application that meets this condition, to the element cost variable. If no application meets this condition, the process 350 determines 370 if another element is included in the user selection and has not been analyzed for downtime business cost. If there is another element included in the user selection, the process 350 selects 372 the next element, initializes the cost variable associated with the element to zero, and returns to determine 362 if there are host servers connect to that particular element. If all the elements included in the user selection have been analyzed for downtime business cost, the process 350 reports each element cost variable to the user for disseminating the cost analysis and stops 376. For example a report may be generated by the process to provide the user with the particular costs used in the analysis, warnings associated with analysis (e.g., some servers or applications were not assigned downtime business cost), a list of the components prioritized by the calculated cumulative risk value ($/h), a list of the components prioritized by the calculated cumulative risk value and by application type, and a list of the applications associated with each component.

Figure 13:
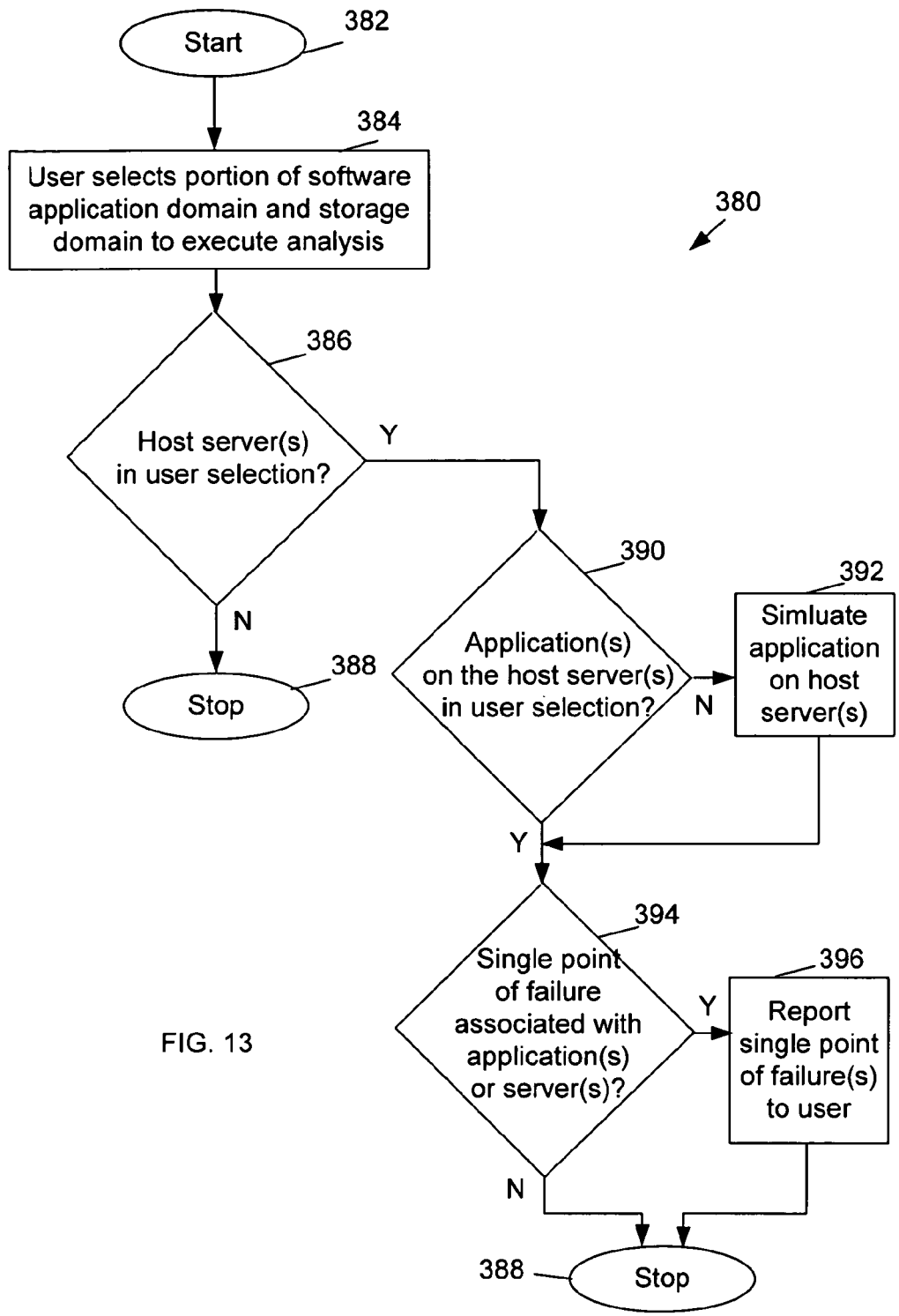
FIG. 13 is a flow chart for a single point of failure risk analysis process.

Referring to FIG. 13, another type of risk analysis is a single point of failure analysis that monitors the capability of each data path originating from an application, in the software application domain 12 (shown in FIG. 6), and identifies any non-functioning data paths or malfunctioning storage domain 14 (also shown in FIG. 6) components associated with the application that will cause the application to malfunction due to an inability to access data. A single point of failure analysis process 380, which may be included in the domain management process 10 (also shown in FIG. 6), is shown. The single point of failure analysis process 380 starts 382 by the user selecting 384 a portion of the software application domain 12 (shown in FIG. 6) and the storage domain 14 (also shown in FIG. 6) for execution of the risk analysis. After the user selection 384 is made, the process 380 determines 386 if one or more host servers are included in the user selection. If no host servers are included in the user selection, then the single point of failure process 380 stops 388. But, if one or more host servers are present in the user selection, the process 380 determines 390 if one or more applications are present on the one or more host servers included in the user selection. If an application does not reside on one or more of the host servers in the user selection, the process 380 simulates 392 the presence of an application on each host server where an application does not reside. After the application has been simulated 392 or the process determines that each host server in the user selection has one or more applications, the process 380 determines 394 if a single point of failure is associated with each application that is present or is simulated on each of the host servers included in the user selection. If the process 380 determines that there is one or more single points of failure each application, the process reports 396 each of the single points of failure to the user and then stops 388. If no single points of failure are associated with each application, then the process reports the absence of any single points of failure to the user and the process stops 388. In some arrangements the process 380 may also report any components in the user selection associated with any single points of failure.

Another type of risk analysis may incorporate the functionality of the single failure point process 380 and the downtime business cost analysis 350 (shown in FIG. 12). In this particular risk analysis the components of a user selection are first prioritized based by downtime business cost. Second, the components are further prioritized based on whether multiple data paths are used for protecting against the event of data path failure. For example, if two switches are each included in a data path associated to the application, the downtime business cost assigned to each switch is reduced by 50%. So if the assigned application downtime business cost is $10,000, then the cost assigned to each switch is $5,000. In some arrangements the downtime business cost may be further reduced if the storage components are clustered. Clustering is the use of multiple storage devices, or other computing devices, and redundant interconnections, to form a single highly-available system to provide load balancing as well as high availability. So if a storage component is included in a cluster, the downtime business cost can be further reduced, for example, by another 50%. Also similar to the previous two risk analysis, reports may be generated to provide the user with the results from the analysis.

Figure 14:
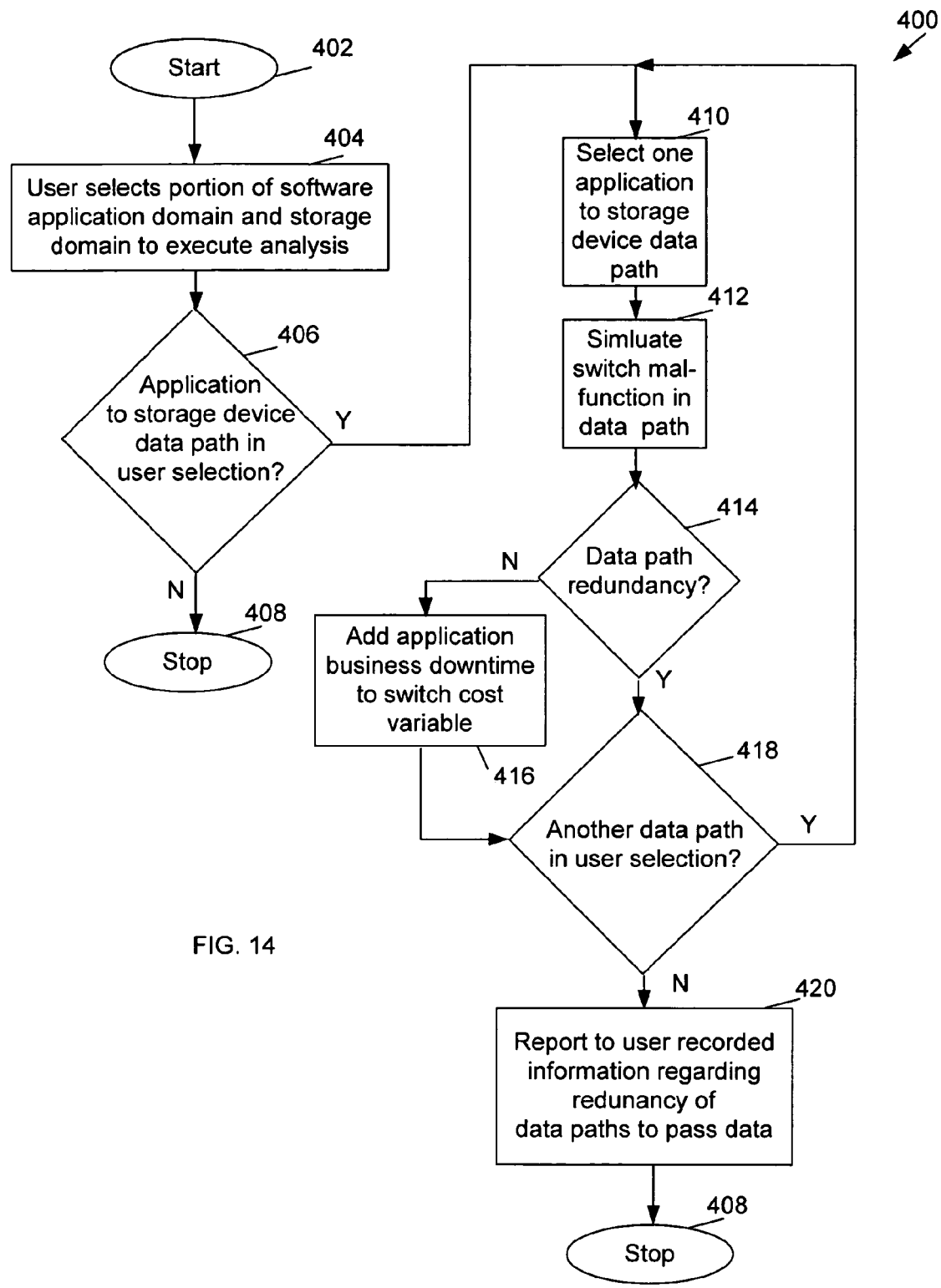
FIG. 14 is a flow chart for a data path redundancy risk analysis process.

Still another risk analysis process may analyze SAN redundancy to warn a user against potential dangerous SAN fabric design. Referring to FIG. 14 a SAN redundancy risk analysis process 400, which may be included in the domain management process 10 (also shown in FIG. 6), is shown. The SAN redundancy risk analysis process 400 starts 402 by the user selecting 404 a portion of the software application domain 12 (shown in FIG. 6) and the storage domain 14 (also shown in FIG. 6) for execution of the risk analysis. After the user selection 404 is made, the process 400 determines 406 if the user selection includes one or more data paths that extend from an application to a storage device. If the user selection does not include a data path that extends from an application to a storage device the SAN redundancy risk analysis process 400 stops 408. If one or more data paths in the user selection extend from an application to a storage device, the process 400 selects 410 one the of the data paths that extends from an application to a storage device and then simulates 412 a malfunction of a switch included in the selected data path. After simulating 412 the switch failure, the process 400 determines 414 if there is one or more redundant paths for data to travel due to simulated switch failure. If the process 400 determines that there is no redundant path for data to pass, the selected data path is considered failed and the downtime business cost of the application is added 416 to the cost variable associated with the particular switch with the simulated malfunction. If the process determines that a redundant data path is present or after the downtime application cost is added to the switch cost variable, the process 400 determines 418 if another data path included in the user selection extends from an application to a storage device. If another data path is present the process 400 returns to select another one of the data paths that extend from an application to a storage device. If there is no unanalyzed data path remaining, which extends from an application to a storage device, the process 400 reports 420 to the user the results of the redundancy analysis and stops 408. Typically the reporting 420 may include the data paths included in the user selection that passed and failed the redundancy analysis and the cost variable of the switches included in the analysis along with a determination if one or more of the switch are also a single point of failure.

In still another risk analysis the compatibility of components (i.e., switches, SANs, NAS drives, etc.) included in a user selection may be analyzed by one or more rules stored in a rule database. One possible rule may compare the configuration of each component, included in the user selection, against configuration information in the rule database. For example, each component may be analyzed to determine if the appropriate vender-suggested firmware is executed by comparing, for example, component type, vendor identification, model number, firmware revision level, and/or other similar configuration parameter. Also, components may be reduced into subcomponents for this analysis. For example, a host server component may be broken down to a host bus adapter (HBA), a volume manager, and a file system. Each component may have multiple configurations stored in the rule database since different firmware revisions could be certified with this release.

Another rule that may be used in the compatibility analysis is the latest firmware rule. For analyzing using this rule, each component configuration, included in the user selection, is compared to the associated configuration information in the rule database to determine if the latest known firmware is executed on each component. Also, in some arrangements a rule may be used to detect switches in the same fabric (i.e., one or more fibre channel switches in some networked topology) containing different firmware. Still another rule may specifically flag any elements that meet the predetermined conditions of this rule. After one or more rules are applied to the components of the user selection, a report can be generated to provide the user with the analysis results for each component included in the user selection along with warnings associated with components that failed one or more of the applied rules, such as improper or outdated firmware executing on a component.

Figure 15:
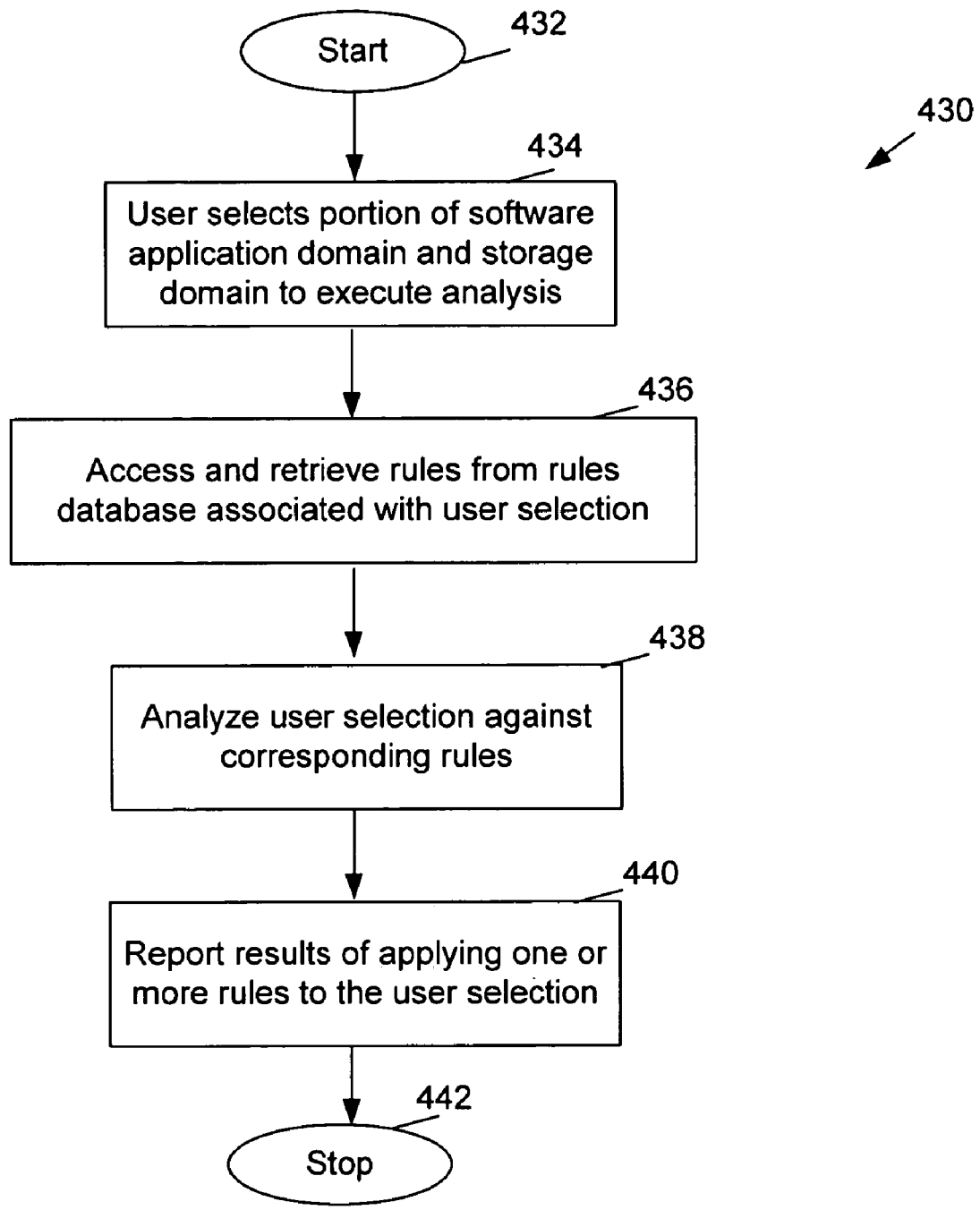
FIG. 15 is a flow chart for a configuration compatibility risk analysis process.

Referring to FIG. 15 a component compatibility analysis process 430, which may be included in the domain management process 10 (shown in FIG. 6), is shown. The component compatibility analysis process 430 starts 432 by the user selecting 434 a portion of the software application domain 12 (shown in FIG. 6) and the storage domain 14 (also shown in FIG. 6) for execution of the analysis. After the user selection 434 is made, the process 430 accesses 436 and retrieves one or more rules associated with the user selection from a rules database. After the one or more rules have been retrieved 436, the process 430 analyzes 438 each component against the one or more rules that correspond to the component. After analyzing 438 each component to the one or more corresponding rules, the process 430 reports 440 the results of applying the one or more rules to the components of the user selection. After reporting 440 to the user the component compatibility analysis process 430 stops 442.

Referring back to FIG. 2, access to components included in the storage domain 14 can be constrained by one or more constraint methods to assist the operating system 22. For example, three constraint methods can be applied to the storage domain 14 to assist the operating system 22. Some operating systems have been designed for directly attached storage devices and not for distributed storage networks such as a SAN. Based on this design, operating systems may assume a particular order of the store devices present on a bus. But, while this assumption may be valid for directly attached storage devices where the order persists after a system reboot, it may not be valid for distributed storage networks connected to a SCSI bus. For example, the order of the storage devices in an SAN on a SCSI bus may depend on numerous factors (e.g., WWN of the individual devices) that are outside the control of the operating system. By constraining the address of each storage device, the operating may not use the invalid assumption. In particular, by binding the WWN of each storage device to a particular bus address (i.e., a SCSI ID address) the operating system will not be alerted that the storage device was a previously mounted volume on another SCSI target ID address. Also, in some arrangements the domain management process 10 stores binding information in one or more tables. For example, a table can contain information associated with a combination of an HBA port, HBA SCSI Bus ID and a HBA logical unit number (LUN) number for mapping a particular combination of storage domain components.

Figure 16:
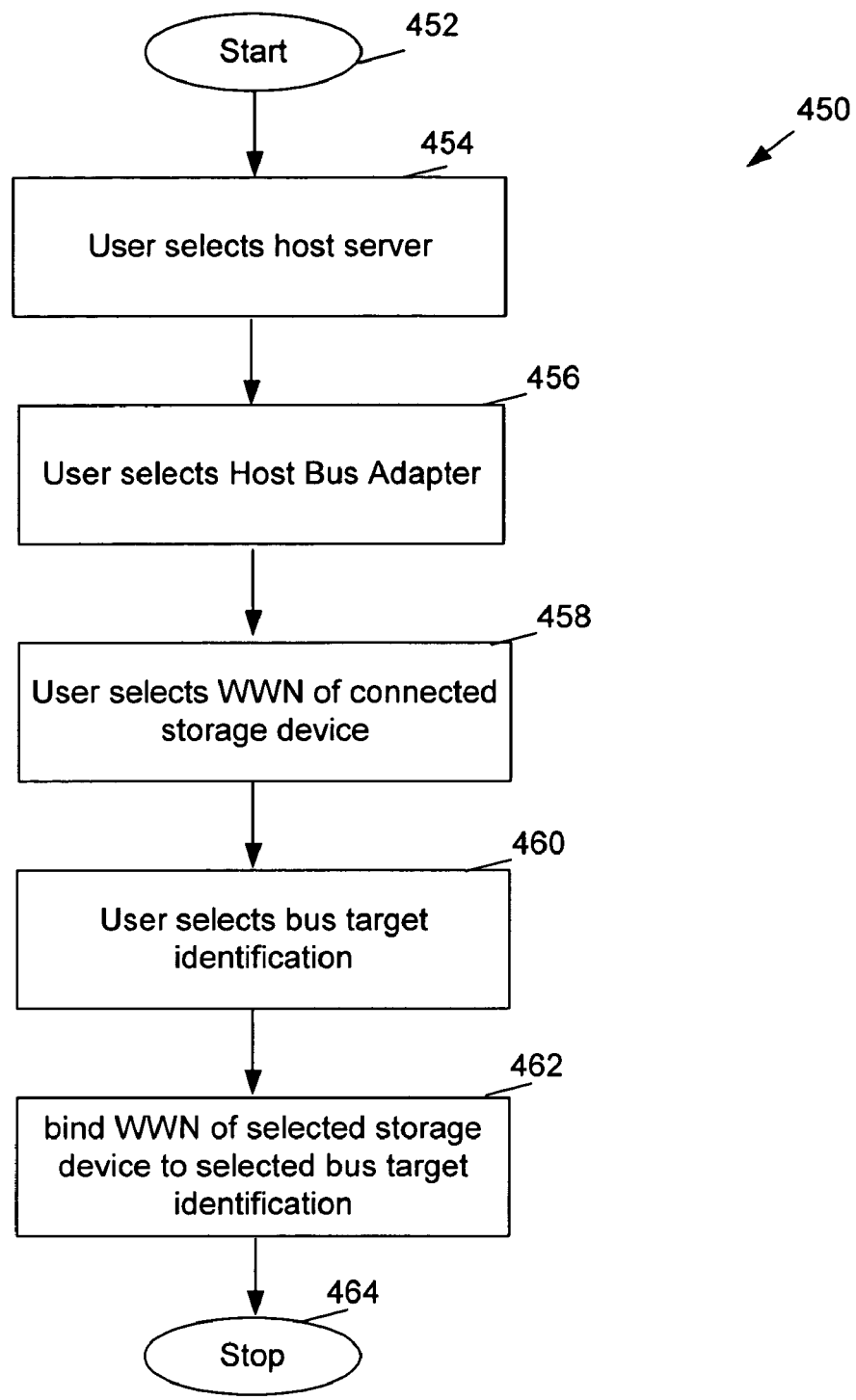
FIG. 16 is a flow chart for a server binding process for constraining a storage system.

Referring to FIG. 16 a persistent binding process 450, which may be included in the domain management process 10 (shown in FIG. 2), is shown. The persistent binding process 450 starts 452 by the user selecting 454 a host server that is connected to the storage device to be bound. After selecting 454 the server host, the process 450 has the user select 456 a host bus adapter (HBA) that is used by the host server to communicate to the storage device of interest. After selecting 456 the HBA, the process 450 has the user select the WWN 458 of the particular storage device to be bound and select 460 the bus target identification (e.g., SCSI target identification) that is to be bound to the WWN of the storage device. After selecting 458 the WWN and selecting 460 the bus target identification, the persistent binding process 450 binds 462 the WWN of the selected storage device to the selected bus target identification and the process ends 464.

Referring to FIG. 2, the second of the three constraint methods provides security and isolation functionality to the SAN 38 by grouping components into a single group so that components within the group can sense the other group members but components outside the group cannot sense any of the group members, even if the outside components are connected to one or more of the group members. Typically this zoning method is accomplished either by hardware zoning or software zoning depending upon the type of component being added to the group. For example, some switch ports may only be zoned by hardware, however some fabric channel switch software allows grouping by software zones. Also, only certain entities such as switch ports, storage device port assigned a WWN, or a logical unit number (LUN) which is a unique identifier that is used on a bus (e.g., SCSI bus) to enable the bus to differentiate among up to eight separate devices may be zoned.

Figure 17:
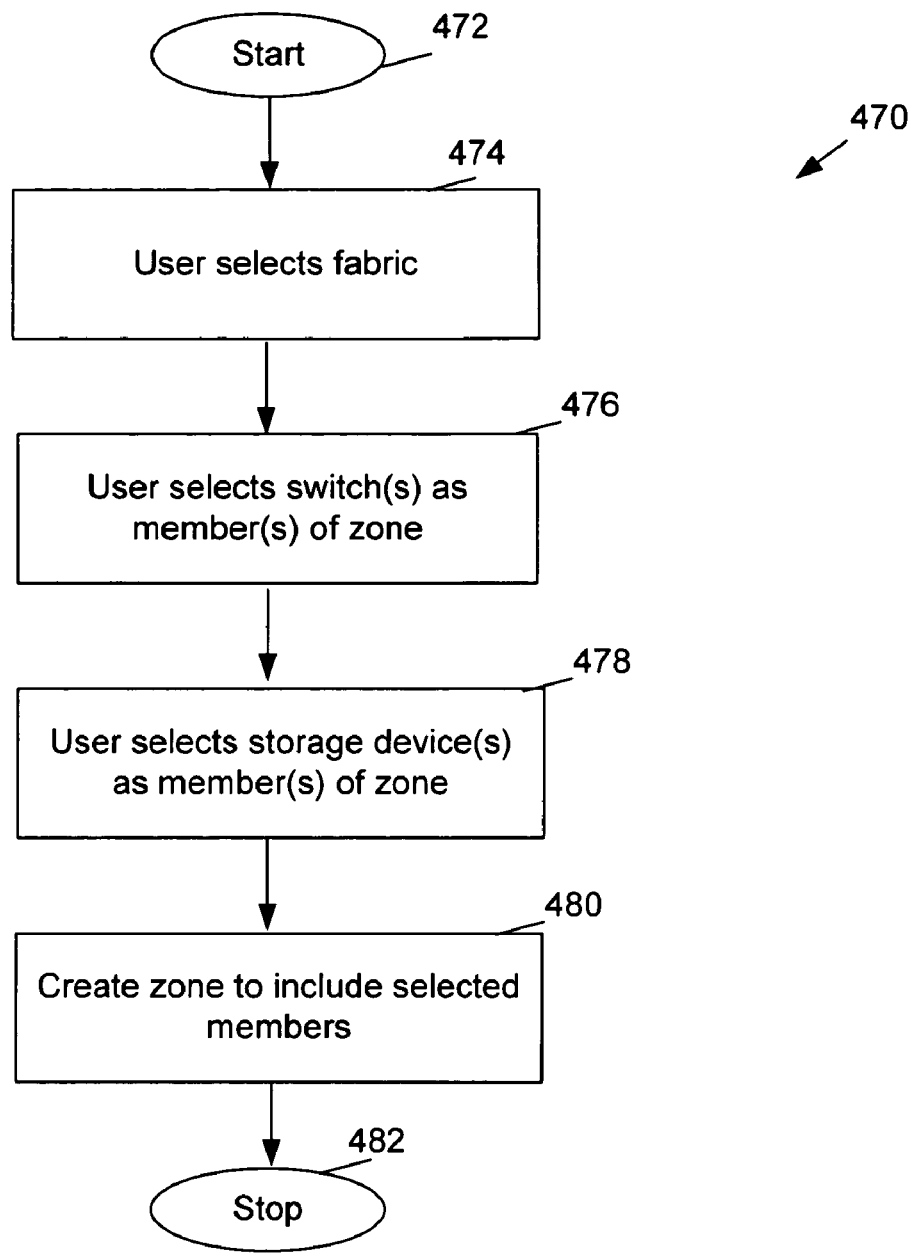
FIG. 17 is a flow chart for a device zoning process for constraining a storage system.

Referring to FIG. 17 a zoning process 470, which may be included in the domain management process 10 (shown in FIG. 2), is shown. The zoning process 470 starts 472 by the user selecting 474 a fabric included in the storage domain 14 (also shown in FIG. 2). After the fabric is selected 474, the process 470 has the user select 476 one or more switches included in the selected fabric for zone membership. The user shall have the ability to drill down to the switch port level and select a port that is a zone-able entity. After the one or more switches have been selected 476, the process 470 has the user select 478 one or more storage devices for zone membership. In this case the user shall have the ability to drill down to the WWN of the particular storage device and the LUN of the WWN of the zone-able storage device. Once the one or more switches and storage devices have been selected 476, 478, the zoning process 470 creates 480 a zone to include the selected members so that the members can be sensed by other members but not by components outside the newly created zone. After creating 480 the zone, the zoning process 470 stops 482.

Referring to FIG. 2, a third constraint method that can be placed on the storage domain 14 is by controlling access to one or more of the storage devices included the SAN 38. By controlling access, the host server 24 can be restricted from accessing and subsequently storing and retrieving data on the storage device 40, 42, 44 included in the SAN 38. For example, by restricting the host server access from RAID #1 42 and tape storage #0 44, all of the data marked for storage through the host server 24 is placed on RAID #0 40 and the other storage devices 42, 44 can be used by another host server (not shown).

Figure 18:
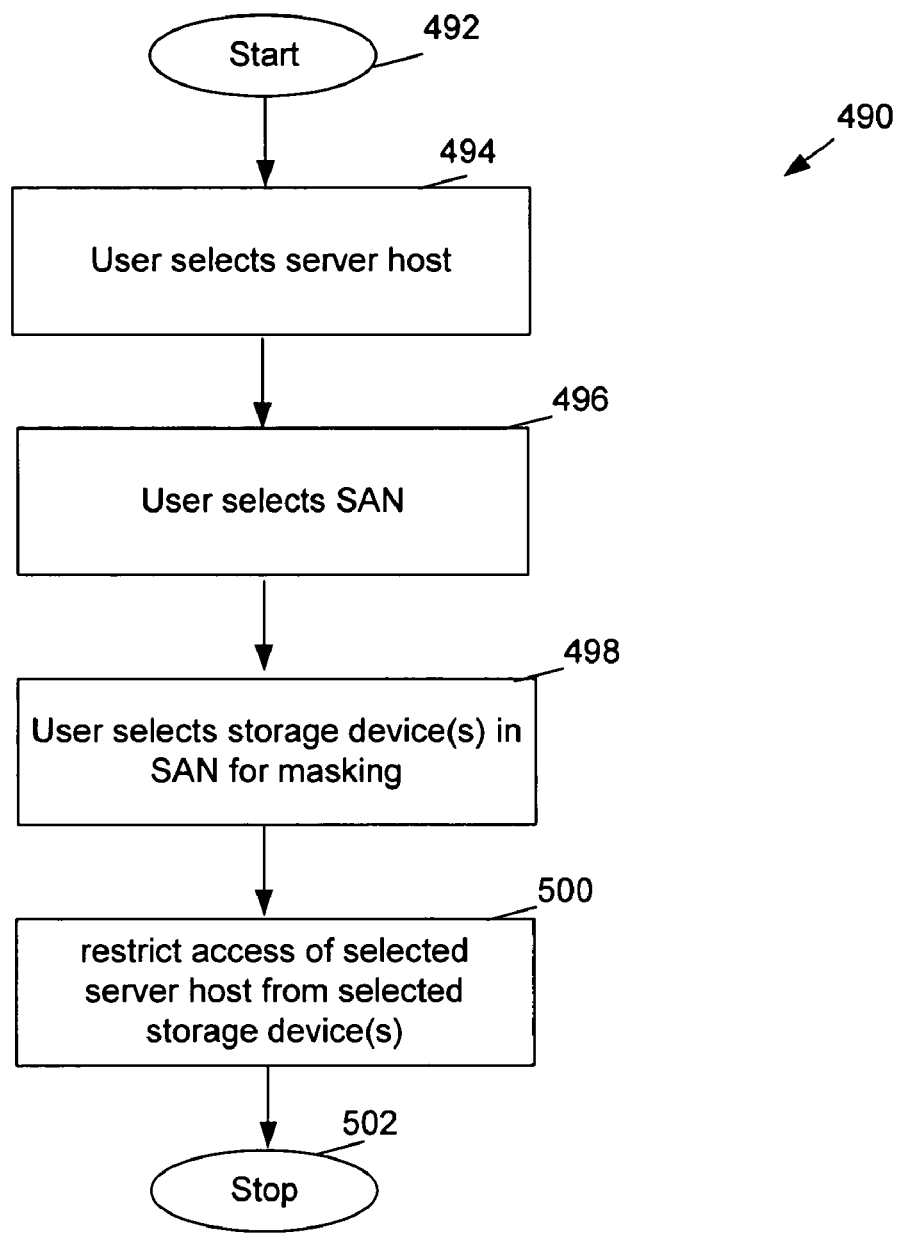
FIG. 18 is a flow chart for a masking process for constraining a storage system.

Referring to FIG. 18 a masking process 490, which may be included in the domain management process 10 (shown in FIG. 2), is shown. The masking process 490 starts 492 by the user selecting 494 a host server in order to have its access restricted to one or more particular storage devices in a SAN. After the user has selected 494 the host server, the process 490 has the user select 496 a particular SAN which includes the one or more storage devices that are to have access restricted from the selected host server. After selecting 496 the SAN, the process 490 has the user select 498 one or more storage devices in the SAN that the selected host server is to be restricted from. After the one or more storage devices have been selected 498, the process 490 restricts 500 access of selected server host to the one or more selected storage devices and then stops 502. By employing all three of these constraint methods on the storage domain 14 (shown in FIG. 2), data storing by one or more host servers may be tailored for quick and efficient access to particular storage devices included in a SAN.

Figure 19:
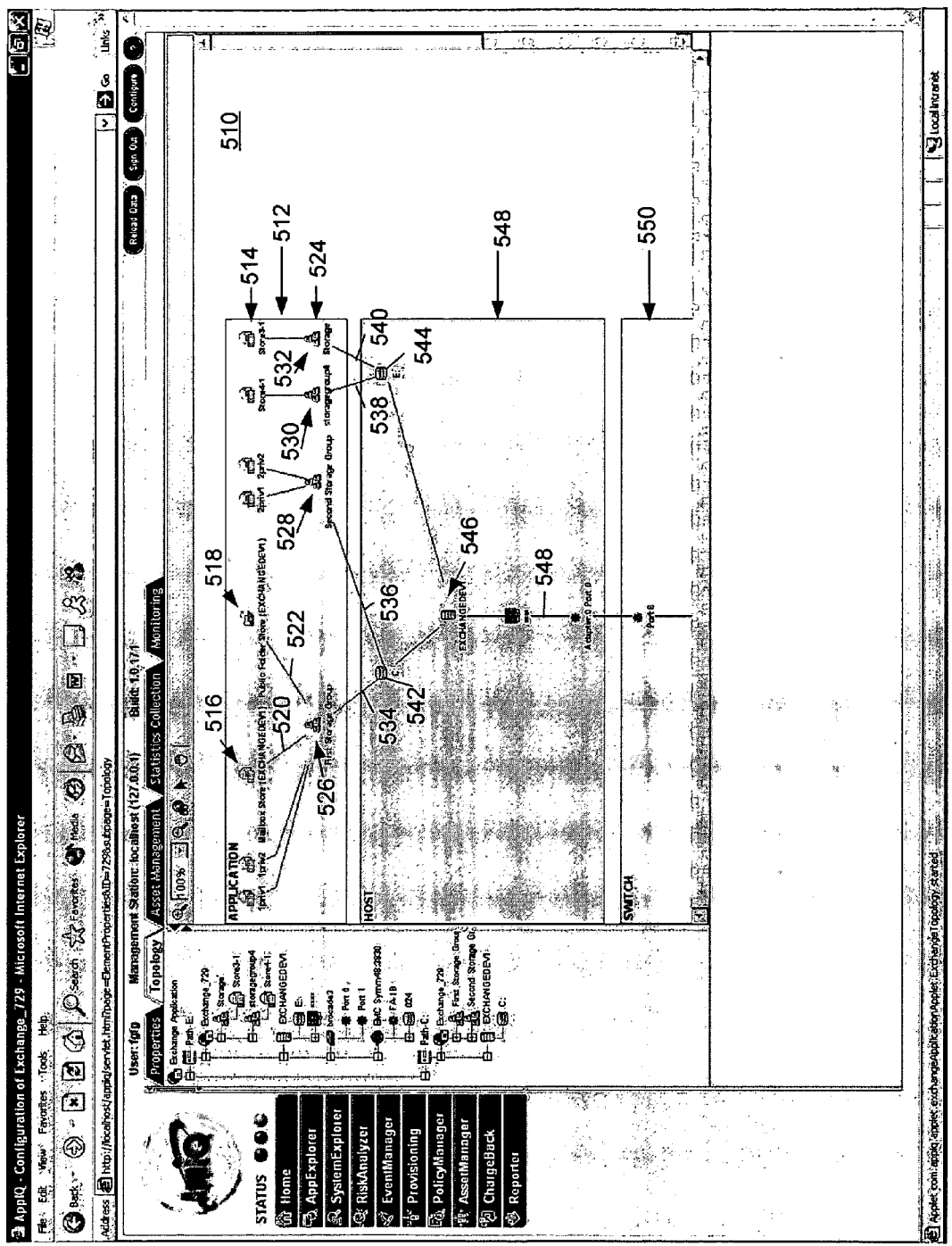
FIG. 19 is a representation of a graphical user interface of a domain management process.

Referring to FIG. 19, a graphical user interface 510 included in the domain management process 10 is shown displaying graphical representations of the components included in the software application and storage domains 12, 14 (also shown in FIG. 1) after stitching collected information. An email software application, which is included in the application domain 12 (also shown in FIG. 1), is graphically represented with an application level 512 that includes some components of the email software application that are positioned on an upper hierarchical level 514 that includes a mailbox store 516, a public folder store 518, and other assorted email message stores. Respective data paths 520, 522 are shown connecting the components of the upper hierarchical level 514 to components in a lower hierarchical level 524 of the application. For example, one data path 520 displays the connection between the mailbox store 516 and a first storage group 526 and a different data path 522 shows the connection between the public folder store 514 and the first storage group 520. As mentioned, typically this information is provided to domain management process 10 by the particular agent assigned to the mailboxes of the email application. The lower hierarchical level 524 of the application level 512 also includes other storage groups 528, 530, 532 for grouping other upper level components. Each of the storage groups 526, 528, 530, 532 is connected to a respective data path 534, 536, 538, 540 that provides a graphical path to a particular storage label (e.g., "C:", "E:") 542, 544 of a host server 546 in a host level 548 of the storage domain 14. For example, as shown in the figure, the mailboxes store 516 is placed in the first storage group 526 that is stored on the "C:" drive 542 of the host server 546 that is located in the host level 548 of the storage domain 14 (shown in FIG. 1). Continuing down the graphical tree structure of the levels included in the application and storage domains 12, 14, the host server 546 passes data over a data path 548 to a switch level 550 that is also included in the storage domain 14 and includes a graphical representation of one or more switches (not shown) present in the storage domain along with the associated data paths. Below the switch level 550 a subsystem level (not shown) includes graphical representations of the storage devices that are connected by data paths to the switch level 550. For example, graphical representations of one or more SAN or NAS drives may be included in the subsystem level to represent the storage devices of the storage domain 14 which provide the actual data storage locations for the mailbox store 512 and the other assorted stores.

Although some implementations have been described, other implementations are also within the scope of the following claims.

The domain management process 10 (shown in FIG. 1) described herein is not limited to the software embodiment described above; it may find applicability in any computing or processing environment. The domain management process 10 may be implemented in hardware, software, or a combination of the two. For example, the domain management process 10 may be implemented using circuitry, such as one or more of programmable logic (e.g., an ASIC), logic gates, a processor, and a memory.

The domain management process 10 may be implemented in computer programs executing on programmable computers that each includes a processor and a storage medium readable by the processor (including volatile and nonvolatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the domain management process 10. The domain management process 10 may also be implemented as a machine-readable storage medium, configured with a computer program, where, upon execution, instructions in the computer program cause a machine to operate to perform the functions of the domain management process described above.

Embodiments of the domain management process 10 may be used in a variety of applications. Although the domain management process 10 is not limited in this respect, the domain management process may be implemented with memory devices in microcontrollers, general purpose microprocessors, digital signal processors (DSPs), reduced instruction-set computing (RISC), and complex instruction-set computing (CISC), among other electronic components.

Embodiments of the domain management process 10 may also be implemented using integrated circuit blocks referred to as core memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A method for constraining access to a storage system comprises:
   assigning a permanent bus identification to a storage device included in the storage system;
   grouping a switch and the storage device included in the storage system such that data only passes to the storage device from the switch; and
   restricting access to the storage device from a server included in the storage system.

2. The method of claim 1 wherein the storage device is included in a storage area network.

3. The method of claim 1 wherein the bus identification is a SCSI identification number.

4. The method of claim 1 wherein a user selects the storage device that is assigned the permanent bus identification.

5. The method of claim 1 wherein a user selects a server connected to the storage device that is assigned the permanent bus identification.

6. The method of claim 1 wherein a user selects the switch.

7. The method of claim 1 wherein a user selects a storage area network that includes the storage device.

8. The method of claim 1 wherein a user selects the server that has restricted access to the storage device.

9. A computer program product residing on a computer readable medium comprises instructions for constraining access to a storage system, the instructions cause a computer to:
assign a permanent bus identification to a storage device included in the storage system;
group a switch and the storage device included in the storage system such that data only passes to the storage device from the switch; and
restrict access to the storage device from a server included in the storage system.

10. The computer program product of claim 9 wherein the storage device is included in a storage area network.

11. The computer program product of claim 9 wherein the bus identification is a SCSI identification number.

12. The computer program product of claim 9 wherein a user selects the storage device that is assigned the permanent bus identification.

13. The computer program product of claim 9 wherein a user selects a server connected to the storage device that is assigned the permanent bus identification.

14. The computer program product of claim 9 wherein a user selects the switch.

15. The computer program product of claim 9 wherein a user selects a storage area network that includes the storage device.

16. The computer program product of claim 9 wherein a user selects the server that has restricted access to the storage device.

17. A process for constraining access to a storage system comprises:
an assignment process to assign a permanent bus identification to a storage device included in the storage system;
a grouping process to group a switch and the storage device included in the storage system such that data only passes to the storage device from the switch; and
an access process to restrict access to the storage device from a server included in the storage system.

18. The process of claim 17 wherein the storage device is included in a storage area network.

19. The process of claim 17 wherein the bus identification is a SCSI identification number.

20. The process of claim 17 wherein a user selects the storage device that is assigned the permanent bus identification.

21. The process of claim 17 wherein a user selects a server connected to storage device that is assigned the permanent bus identification.

22. The process of claim 17 wherein a user selects the switch.

23. The process of claim 17 wherein a user selects a storage area network that includes the storage device.

24. The process of claim 17 wherein a user selects the server that has restricted access to the storage device.

\* \* \* \* \*